[12] United States Patent
Sakai et al.

(10) Patent No.: US 10,534,112 B2
(45) Date of Patent: Jan. 14, 2020

(54) MICROLENS ARRAY, IMAGE DISPLAY APPARATUS, OBJECT APPARATUS, AND MOLD

(71) Applicants: Kohji Sakai, Tokyo (JP); Miho Higuchi, Kanagawa (JP); Jun Watanabe, Kanagawa (JP)

(72) Inventors: Kohji Sakai, Tokyo (JP); Miho Higuchi, Kanagawa (JP); Jun Watanabe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/230,497

(22) Filed: Dec. 21, 2018

(65) Prior Publication Data

US 2019/0121002 A1   Apr. 25, 2019

Related U.S. Application Data

(62) Division of application No. 15/719,213, filed on Sep. 28, 2017, now Pat. No. 10,203,431.

(30) Foreign Application Priority Data

Sep. 28, 2016 (JP) .................................. 2016-188937
Sep. 22, 2017 (JP) .................................. 2017-181894

(51) Int. Cl.
*G02B 3/00* (2006.01)
*G02B 27/48* (2006.01)
(Continued)

(52) U.S. Cl.
CPC ............ *G02B 3/0056* (2013.01); *B60K 35/00* (2013.01); *G02B 3/0006* (2013.01);
(Continued)

(58) Field of Classification Search
CPC .. G02B 3/0012; G02B 3/0018; G02B 3/0037; G02B 3/0043; G02B 3/0006; G02B 3/0056
See application file for complete search history.

(56) References Cited

U.S. PATENT DOCUMENTS 5,581,379 A   12/1996 Aoyama
5,999,345 A   12/1999 Nakajima
(Continued)

FOREIGN PATENT DOCUMENTS

JP   2007-188092   7/2007
JP   2007-193349   8/2007
(Continued)

OTHER PUBLICATIONS

U.S. Appl. No. 09/031,410, filed Feb. 26, 1998 Kohji Sakai, et al.
(Continued)

*Primary Examiner* — William C. Dowling
(74) *Attorney, Agent, or Firm* — Oblon, McClelland, Maier & Neustadt, L.L.P.

(57) ABSTRACT

A microlens array includes N lenses ranging from a $1^{st}$ lens to an $N^{th}$ lens and a lens arrangement area. N is a positive integer. The lens arrangement area has the N lenses arranged in array. The lens arrangement area receives light emitted from a light source. An $i^{th}$ (i being $1^{st}$ to $N^{th}$) lens satisfies a conditional expression below:

$-20° \leq \theta \leq 20°$ where
θ denotes an angle formed by a main-axis orientation of double refraction and a reference orientation.

15 Claims, 21 Drawing Sheets

(51) Int. Cl.
*G02B 27/01* (2006.01)
*B60K 35/00* (2006.01)
*G03B 29/00* (2006.01)
*G03B 21/625* (2014.01)
*H04N 9/31* (2006.01)
*G03B 21/20* (2006.01)
*G03B 21/00* (2006.01)

(52) U.S. Cl.
CPC ......... *G02B 3/0018* (2013.01); *G02B 3/0031* (2013.01); *G02B 3/0037* (2013.01); *G02B 3/0043* (2013.01); *G02B 27/0101* (2013.01); *G02B 27/48* (2013.01); *G03B 21/625* (2013.01); *G03B 29/00* (2013.01); *H04N 9/3129* (2013.01); *B60K 2370/155* (2019.05); *B60K 2370/1529* (2019.05); *B60K 2370/31* (2019.05); *B60K 2370/333* (2019.05); *B60K 2370/334* (2019.05); *B60K 2370/52* (2019.05); *G02B 2027/0114* (2013.01); *G03B 21/008* (2013.01); *G03B 21/2013* (2013.01); *G03B 21/2033* (2013.01)

(56) References Cited

U.S. PATENT DOCUMENTS

| | | | |
|---|---|---|---|
| 6,166,842 | A | 12/2000 | Aoki |
| 6,229,638 | B1 | 5/2001 | Sakai |
| 6,256,133 | B1 | 7/2001 | Suzuki |
| 6,288,819 | B1 | 9/2001 | Aoki |
| 6,343,862 | B1* | 2/2002 | Sawai .............. G02B 3/0056 349/8 |
| 6,347,004 | B1 | 2/2002 | Suzuki |
| 6,366,384 | B1 | 4/2002 | Aoki |
| 6,404,555 | B1 | 6/2002 | Nishikawa |
| 6,509,995 | B1 | 1/2003 | Suzuki |
| RE40,109 | E | 2/2008 | Sakai |
| 7,572,385 | B2* | 8/2009 | Li ................ G02B 3/0012 216/26 |
| 8,085,294 | B2* | 12/2011 | Takagi ............. G02B 27/26 348/42 |
| 9,158,124 | B2 | 10/2015 | Saisho |
| RE45,918 | E | 3/2016 | Saisho |
| 2001/0022343 | A1 | 9/2001 | Sakai |
| 2001/0043382 | A1 | 11/2001 | Suzuki |
| 2001/0048543 | A1 | 12/2001 | Aoki |
| 2001/0053014 | A1 | 12/2001 | Aoki |
| 2001/0055140 | A1 | 12/2001 | Sakai |
| 2002/0159122 | A1 | 10/2002 | Aoki |
| 2003/0063355 | A1 | 4/2003 | Suzuki |
| 2003/0072065 | A1 | 4/2003 | Suzuki |
| 2003/0108821 | A1* | 6/2003 | Mei ............... G02B 3/0012 430/321 |
| 2003/0209659 | A1 | 11/2003 | Sakai |
| 2003/0214694 | A1 | 11/2003 | Sakai |
| 2004/0100674 | A1 | 5/2004 | Sakai |
| 2004/0184127 | A1 | 9/2004 | Nakajima |
| 2006/0072199 | A1* | 4/2006 | Morishita ........ B29D 11/00278 359/542 |
| 2006/0077500 | A1 | 4/2006 | Hayashi |
| 2006/0187294 | A1 | 8/2006 | Saisho |
| 2007/0091398 | A1 | 4/2007 | Ueda |
| 2007/0211324 | A1 | 9/2007 | Sakai |
| 2007/0211326 | A1 | 9/2007 | Saisho |
| 2007/0253048 | A1 | 11/2007 | Sakai |
| 2008/0025759 | A1 | 1/2008 | Ichii |
| 2008/0055692 | A1 | 3/2008 | Saisho |
| 2008/0068689 | A1 | 3/2008 | Saisho |
| 2008/0068693 | A1 | 3/2008 | Hayashi |
| 2009/0002792 | A1 | 1/2009 | Sakai |
| 2009/0059333 | A1 | 3/2009 | Sakai |
| 2010/0194843 | A1 | 8/2010 | Sakai |
| 2011/0063594 | A1 | 3/2011 | Sakai |
| 2011/0076456 | A1* | 3/2011 | Wang ............... B29D 11/00365 428/164 |
| 2011/0090549 | A1 | 4/2011 | Sakai |
| 2011/0228368 | A1 | 9/2011 | Sakai |
| 2012/0050444 | A1 | 3/2012 | Sakai |
| 2013/0070323 | A1 | 3/2013 | Tokita |
| 2013/0076851 | A1 | 3/2013 | Watanabe |
| 2013/0155166 | A1 | 6/2013 | Watanabe |
| 2013/0250029 | A1 | 9/2013 | Kubo |
| 2015/0346484 | A1 | 12/2015 | Suzuki |
| 2016/0261090 | A1 | 9/2016 | Sakai |
| 2018/0024360 | A1 | 1/2018 | Inamoto |
| 2019/0162880 | A1* | 5/2019 | Yamamoto ....... B29D 11/00307 |

FOREIGN PATENT DOCUMENTS

| | | |
|---|---|---|
| JP | 2007-206707 | 8/2007 |
| JP | 2008-052247 | 3/2008 |
| JP | 2008-070797 | 3/2008 |
| JP | 2008-076526 | 4/2008 |
| JP | 2008-076557 | 4/2008 |
| JP | 2008-107581 | 5/2008 |
| JP | 2008-122811 | 5/2008 |
| JP | 2009-058677 | 3/2009 |
| JP | 2009-098562 | 5/2009 |
| JP | 2009-300689 | 12/2009 |
| JP | 2010-071732 | 4/2010 |
| JP | 2010-197990 | 9/2010 |
| JP | 2010-210966 | 9/2010 |
| JP | 2010-217353 | 9/2010 |
| JP | 2011-018055 | 1/2011 |
| JP | 2011-066031 | 3/2011 |
| JP | 2011-090111 | 5/2011 |
| JP | 2011-180427 | 9/2011 |
| JP | 2012-047863 | 3/2012 |
| JP | 2012-150153 | 8/2012 |
| JP | 2012-168542 | 9/2012 |
| JP | 2012-220695 | 11/2012 |
| JP | 2012-225960 | 11/2012 |
| JP | 2012-252347 | 12/2012 |
| JP | 2013-003329 | 1/2013 |
| JP | 2013-025003 | 2/2013 |
| JP | 2013-025217 | 2/2013 |
| JP | 2013-033123 | 2/2013 |
| JP | 2013-041011 | 2/2013 |
| JP | 2013-068691 | 4/2013 |
| JP | 2013-068694 | 4/2013 |
| JP | 2013-068698 | 4/2013 |
| JP | 2013-068812 | 4/2013 |
| JP | 2013-072910 | 4/2013 |
| JP | 2013-109113 | 6/2013 |
| JP | 2013-160818 | 8/2013 |
| JP | 2013-160971 | 8/2013 |
| JP | 2013-164483 | 8/2013 |
| JP | 2013-178477 | 9/2013 |
| JP | 2013-200439 | 10/2013 |
| JP | 2013-200441 | 10/2013 |
| JP | 2014-026088 | 2/2014 |
| JP | 2014-026205 | 2/2014 |
| JP | 2014-071221 | 4/2014 |
| JP | 2014-098814 | 5/2014 |
| JP | 2014-137471 | 7/2014 |
| JP | 2014-203011 | 10/2014 |
| JP | 2015-169804 | 9/2015 |
| JP | 2015-227986 | 12/2015 |
| JP | 2016-161533 | 9/2016 |
| JP | 2017-062487 | 3/2017 |
| WO | WO2012/117495 A1 | 9/2012 |

OTHER PUBLICATIONS

Polyplastics "The outline of injection molding" Retrieved from the Internet: URL: https://www.polyplastics.com/en/support/mold/outline/, searched on Sep. 19, 2017.

* cited by examiner

MICROLENS ARRAY, IMAGE DISPLAY APPARATUS, OBJECT APPARATUS, AND MOLD

CROSS-REFERENCE TO RELATED APPLICATIONS

This patent application is a division of U.S. patent application Ser. No. 15/719,213 filed Sep. 28, 2017, which is based on and claims priority pursuant to 35 U.S.C. § 119(a) to Japanese Patent Application No. 2016-188937 filed Sep. 28, 2016, and Japanese Patent Application No. 2017-181894 filed Sep. 22, 2017 in the Japan Patent Office, the entire disclosures of each of which are hereby incorporated by reference herein.

BACKGROUND

Technical Field

Embodiments of the present disclosure relate to a microlens array element, an image display apparatus, an object apparatus, and a mold.

Background Art

An image display apparatus, such as a heads-up display (HUD), is known to include a screen member, such as a microlens array element.

The screen member, for example, a microlens array element, has room for improvement in optical characteristics.

SUMMARY

In one aspect of this disclosure, there is provided an improved microlens array including N lenses ranging from a $1^{st}$ lens to an $N^{th}$ lens (N is a positive integer) and a lens arrangement area having the N lenses arranged in array. The lens arrangement area receives light emitted from a light source. An $i^{th}$ (i is $1^{st}$ to $N^{th}$) lens satisfies a conditional expression below:

$$-20° \leq \theta \leq 20°$$

where $\theta$ denotes an angle formed by a main-axis orientation of double refraction and a reference orientation.

In another aspect of this disclosure, there is provided an improved apparatus including a light source to emit the light, an image forming element to form an image with the light emitted from the light source, and the above-described microlens array. At least a part of the lens arrangement area is irradiated with the light for forming the image.

In still another aspect of this disclosure, there is provided an improved object apparatus including the above-described apparatus, and an object equipped with the apparatus.

In yet another aspect of this disclosure, there is provided an improved microlens array including a plurality of lenses, a lens arrangement area having the plurality of lenses arranged in array, and a gate area adjacent to the lens arrangement area. The gate area has a width that increases in a direction that approaches the lens arrangement area in a planar view. In further aspect of this disclosure, there is provided an improved apparatus including a light source to emit light, an image forming element, and a screen. The light is polarized. The image forming element forms an image with the light emitted from the light source. The screen has N (N being a positive integer) lenses arranged in array. The screen has an optically effective area through which the light for forming the image passes. The N lenses ranging from a $1^{st}$ lens to an $N^{th}$ lens, an $i^{th}$ lens (i being the $1^{st}$ to the $N^{th}$) of the screen satisfying a conditional expression below:

$$-20° \leq \theta \leq 20°$$

where $\theta$ denotes an angle formed by a main-axis orientation of double refraction and a polarization direction of the light beam.

In still further aspect of this disclosure, there is provided an improved mold for producing a microlens array by injection molding including a lens section and a gate section. The lens section forms a lens arrangement area, in which a plurality of lenses is arranged, of a microlens array. The gate section lets resin in the lens section. The gate section has an inner wall that manner increases in width in a direction that approaches the lens section in a planar view.

In still further aspect of this disclosure, there is provided an improved method of displaying an image including generating polarized light, irradiating the polarized light through a screen including a plurality of lenses in an array, and displaying an image using the polarized light which has passed through the screen. Each of the plurality of lenses satisfies:

$$-20° \leq \theta \leq 20°$$

where $\theta$ denotes an angle formed by a main-axis orientation of double refraction and a polarization direction of the polarized light.

BRIEF DESCRIPTION OF THE DRAWINGS

The aforementioned and other aspects, features, and advantages of the present disclosure will be better understood by reference to the following detailed description when considered in connection with the accompanying drawings, wherein.

Figure 1A:
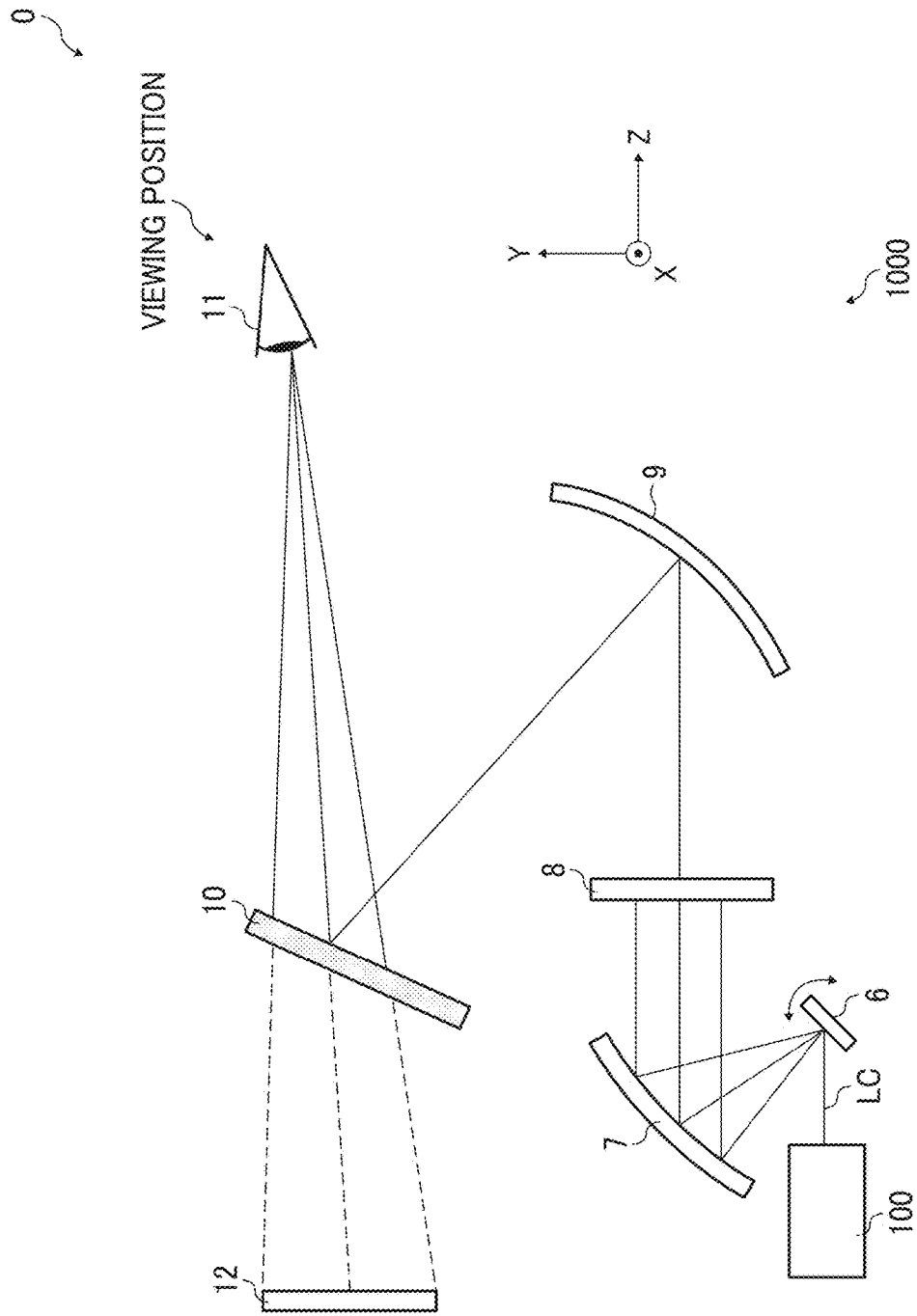
FIGS. 1A through 1C are illustrations of an image display apparatus according to one embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and all of the components or elements described in the embodiments of this disclosure are not necessarily indispensable.

A HUD is known that includes an image forming unit that forms an image and an optical system that project the image onto a windshield of a mobile object such as a vehicle so as to display a virtual image of the image.

Such a HUD forms an intermediate image, and enlarges the intermediate image using a screen member such as a diffuser panel or a microlens array element to form a virtual image in the above-described process.

Particularly when a semiconductor laser is used as a light source, some HUDs employ a microlens array element that contributes to reducing or preventing the occurrence of speckle noise to relatively prevent the blurring of a virtual image.

The microlens array element is typically formed by injection molding, using thermoplastic resin. Such a microlens array element is greatly involved with double refraction. The semiconductor laser is known to emit a light beam that is linearly polarized light. In a microlens array element that is insusceptible to double refraction, the linear polarized light does not change in state between before and after the linearly polarized light passes through the microlens array element. However, in a microlens array element that has a great effect of double refraction, the linear polarization light changes to elliptically polarized light, which changes the ratio of p polarized light relative to s polarized light, i.e., extinction ratio. The extinction ratio differs according to the wavelength of a semiconductor laser even when the double refraction is common. Accordingly, when any desired color is to be generated for a virtual image by using three semiconductor lasers having different wavelengths, a target value of light-intensity balance (power balance) is not obtained. Thus, any desired color is not generated.

Particularly, when the double refraction is uneven in the optically-effective area of the microlens array element, the light-intensity balance is not successfully adjusted. In the present disclosure, the "optically-effective area" refers to the beam-passing area (area through which the beam passes), in which an image to be a virtual image is formed, in the microlens array element. The optically-effective area corresponds to at least a part of the lens arrangement area in the microlens array element.

To handle such a circumstance, a configuration is proposed in which retardation (phase difference) of double refraction is less than or equal to 0.098 times the wavelength of light emitted from a laser light source.

According to the Jones vector, the polarized light that has passed through the microlens array element 8 is obtained by the following formula where $\theta$ denotes the tilt (which is referred to also as a "shift" or a "variation" in orientation of the optic axis) of the optic axis with reference to the polarization direction of linearly polarized light $$\begin{pmatrix} 1 \\ 0 \end{pmatrix}$$

emitted from a laser light source:

$$\begin{pmatrix} x \\ y \end{pmatrix} = T_{\theta,\varepsilon} \begin{pmatrix} 1 \\ 0 \end{pmatrix} = \begin{pmatrix} \cos\theta & -\sin\theta \\ \sin\theta & \cos\theta \end{pmatrix} \begin{pmatrix} \exp(i\frac{\varepsilon}{2}) & 0 \\ 0 & \exp(-i\frac{\varepsilon}{2}) \end{pmatrix} \begin{pmatrix} \cos\theta & \sin\theta \\ -\sin\theta & \cos\theta \end{pmatrix} \begin{pmatrix} 1 \\ 0 \end{pmatrix}$$

With a reduction in value of $\varepsilon$, the values of $T\theta$ and $\varepsilon$ are approximately an identity matrix. Accordingly, the linearly polarized light remains the same between before and after the light passes through the microlens array element.

However, the retardation is very difficult to control with the molding conditions, such as the pressure applied to a mold and the temperature of a mold, and the injection speed of resin. Such a control depends on the physical properties of the thermoplastic resin used.

As a matter of course, there is nothing to be concerned about when the microlens array element is used in the HUD. However, the present inventors have determined that such a thermoplastic resin has a difficulty in, e.g., having a coat to increase transmittance, particularly when mounted on a vehicle.

In other words, the present inventors have determined that the typical microlens array element has room for improvement in increasing the optical properties.

Hence, the present inventors have conceived of the following embodiments of the present disclosure.

Figure 1C:
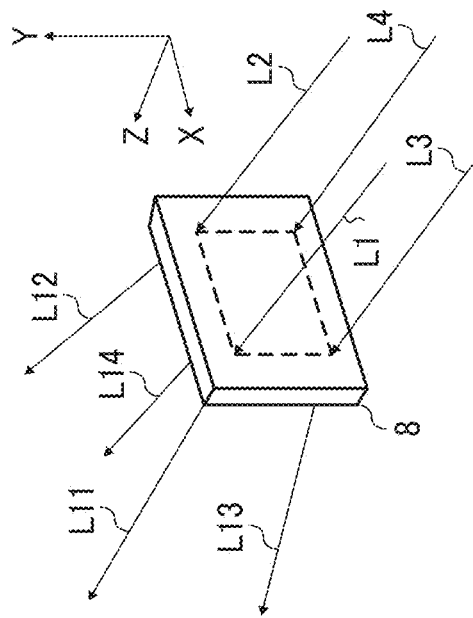
Figure 1B:
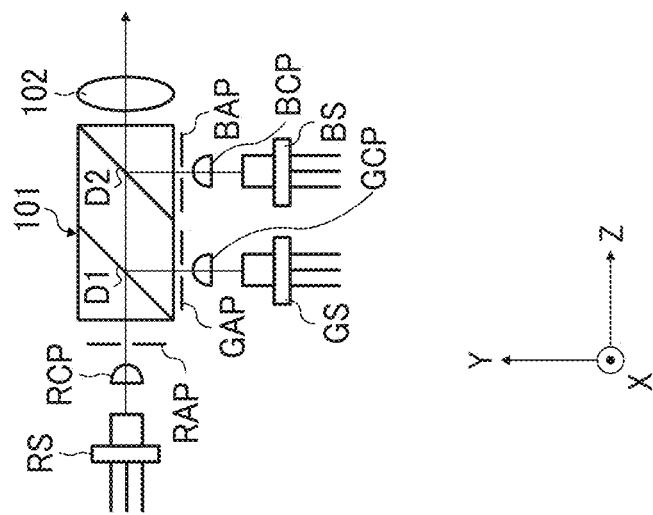

FIGS. 1A-1C illustrate selected portions of an image display apparatus according to an embodiment of the present disclosure.

An image display apparatus 1000 described with reference to FIG. 1A is a heads-up display which displays a two-dimensional color image.

The image display apparatus 1000 is mounted, for example, on a mobile object such as a vehicle, an aircraft, and a ship, and makes navigation information used for operating the mobile object (for example, speed and mileage) visible through a transmission and reflection member 10 (for example, a front windshield) of the mobile object. In the following description, an XYZ three-dimensional orthogonal coordinate system that is set to the mobile object (i.e., a coordinate system that moves with the mobile object in a synchronized manner) is referred to. Note that the term "transmission and reflection member" indicates a member that transmits some rays of the incident light and reflects at least some of the remaining incident light.

In FIG. 1A, a light source unit 100, also referred to as a light source, emits a pixel displaying beam LC for displaying a color image in +Z direction.

The pixel displaying beam LC is one beam in which beams of three colors including red (R), green (G), and blue (B) are combined.

More specifically, the light-source unit 100 is configured, for example, as illustrated in FIG. 1B.

In FIG. 1B, semiconductor lasers RS, GS, and BS, which form a light source, emit laser beams (linearly polarized light) of red, green, and blue (RGB), respectively. In the present example embodiment, laser diodes (LD), which are also referred to as end-surface emitting lasers, are used as the semiconductor lasers RS, GS, and BS. Alternatively, vertical cavity-surface emitting lasers (VCSEL) may be used as the semiconductor lasers RS, GS, and BS, instead of the end-surface emitting lasers.

As illustrated in FIG. 1B, coupling lenses RCP, GCP, and BCP control the divergence of the laser beams emitted from the semiconductor lasers RS, GS, and BS.

The laser beams of RGB colors whose divergence has been controlled by the coupling lenses RCP, GCP, and BCP are shaped by apertures RAP, GAP, and BAP. More specifically, the diameters of the laser beams of RGB colors are controlled by the apertures RAP, GAP, and BAP.

The shaped laser beams of RGB colors enter the beam combining prism 101.

The beam combining prism 101 includes a dichroic film D1 that transmits the R light and reflects the G light, and a dichroic film D2 that transmits the R and G light and reflects the B light.

Accordingly, a single laser beam in which the laser beams of RGB colors are combined is emitted from the beam combining prism 101.

The emitted laser beam is converted by a lens 102 into a "collimated beam" having a prescribed laser-beam diameter. This "collimated beam" corresponds to the pixel displaying beam LC.

Note that the intensity of the laser beams of RGB colors that make up the pixel displaying beam LC is modulated according to the image signal (i.e., image data) of a "two-dimensional color image" to be displayed. The intensity modulation may be performed through direct modulation in which the semiconductor lasers are directly modulated or through external modulation in which the laser beams emitted from the semiconductor lasers are modulated.

In other words, the light-emission intensity of each of the semiconductor lasers RS, GS, and BS may be modulated by a driving unit as a controller according to the image signal of RGB components.

The pixel displaying beam LC that is emitted from the light source 100 is directed towards a two-dimensional deflector 6 that serves as an image forming element, and is two-dimensionally deflected.

In the present example embodiment, the two-dimensional deflector 6 is a minute mirror that moves on a pivot that is formed by "two axes that are orthogonal to each other".

More specifically, the two-dimensional deflector 6 includes micro-electromechanical systems (MEMS) that include minute pivoting mirrors formed by semiconductor processes or the like.

However, no limitation is intended thereby, and the two-dimensional deflector 6 may be, for example, combinations of two minute mirrors that pivot on a single axis in the directions that are orthogonal to each other.

The pixel displaying beam LC that has been two-dimensionally deflected as above travels towards a concave mirror 7, and is reflected to a microlens array element 8.

In other words, the optical effect of the concave mirror 7 is to correct the deformation of an image formed on the transmission and reflection member 10 by the two-dimensionally deflected pixel displaying beam LC.

The pixel displaying beam LC that is reflected at the concave mirror 7 shifts in parallel according to the deflection performed by the two-dimensional deflector 6, and enters the microlens array element 8 to scan the microlens array element 8 two-dimensionally. In the present embodiment, the microlens array element 8 serves as a screen member or a screen.

This two-dimensional scanning forms a "two-dimensional color image" on the microlens array element 8.

As a matter of course, what is displayed on the microlens array element 8 is "only the pixels that are being irradiated by the pixel-displaying light beam LC at that time". A two-dimensional color image is formed as a "set of pixels that are momentarily displayed" realized by two-dimensional scanning using the pixel displaying beam LC. A "two-dimensional color image" is formed on the microlens array element 8 as described above, and the light of the image data on a pixel by pixel basis enters the concave mirror 9 and is reflected.

The microlens array element 8 includes a "minute convex lens arrangement", as will be described later. The concave mirror 9 configures a "virtual image forming optical system".

The "virtual image forming optical system" forms the magnified virtual image 12 of the "two-dimensional color image". The transmission and reflection member 10 is provided in front of the image forming position of the magnified virtual image 12 to reflect the light beam forming the magnified virtual image 12 toward an observer 11 (an eye of the observer is illustrated in FIG. 1A) side. The observer 11 (for example, a driver of the mobile object) visually recognizes the virtual image at a prescribed position on the optical path of the laser beam reflected by the transmission and reflection member 10. The observer 11 visually recognizes the magnified virtual image 12 by the light reflected towards the observer 11 as above.

As illustrated in FIG. 1A, the up-down direction of the figure is denoted by a "Y direction", and the direction perpendicular to the drawing is denoted by an "X direction".

In FIG. 1A, the Y direction usually corresponds to the up-and-down directions for the observer 11, and the Y-axis direction is also referred to as a "vertical direction". In FIG. 1A, the X direction usually corresponds to the right and left directions for the observer 11, and the X direction is also referred to as a "lateral direction".

As described above, the microlens array element 8 has a minute convex lens arrangement.

As will be described later, the minute convex lens arrangement has "a plurality of minute convex lenses (microlenses) that are closely arranged at a pitch close to the pitch of pixels".

Herein, the plurality of micro-convex lenses is two-dimensionally arranged at a predetermined pitch along a plane (XY plane) perpendicular to the Z direction such that the convex surface becomes the incident plane. As a specific array form thereof, there are a matrix-shaped array (square-matrix-shaped array) where the X direction is set as a row direction and the Y direction is set as a column direction and a honeycomb-type array (zigzag array). As an example, the optic axis of each micro-convex lens is parallel to the Z-axis.

The planar shape (shape when viewed from the Z-axis direction) of each micro-convex lens is, for example, a circle, a regular N-gon (N is a natural number equal to or greater than 3), or the like. In the present example embodiment, it is assumed that the minute convex lenses have equal curvature (radius of curvature).

Each of the minute convex lenses isotropically diffuses the pixel displaying beam LC. In other words, each of the minute convex lenses has even diffusing power in all directions, if desired. Such "diffusing function" is briefly described below.

FIG. 1C illustrates four pixel displaying beams L1 to L4 that enter the microlens array element 8, according to the present example embodiment.

The four pixel displaying beams L1 to L4 enter the microlens array element 8 at the four corners of the two-dimensional pixel displaying beam formed on the microlens array element 8.

As the four pixel displaying beams L1 to L4 pass through the microlens array element 8, the pixel displaying beams L1 to L4 are converted into beams L11 to L14. Assuming that a laser beam whose cross section is a horizontally oriented quadrangle surrounded by the pixel displaying beams L1 to L4, enters the microlens array element 8, such a laser beam becomes a "divergent laser beam whose cross section is a horizontally-oriented quadrangle surrounded by the beams L11 to L14".

The function of the minute convex lenses as described above is referred to as the "diffusing function". The "divergent laser beam whose cross section is a horizontally-oriented quadrangle surrounded by the beams L11 to L14" is obtained by temporally collecting the pixel displaying beam that has been converted into a divergent laser beam as described above.

The pixel displaying beam is diffused such that "the laser beam reflected at the transmission and reflection member 10 irradiates a wider area in the proximity of the observer 11".

When the diffusing function described above is not available, the laser beam reflected at the transmission and reflection member 10 irradiates only a "small area in the proximity of an eye of the observer 11".

For this reason, when the observer 11 moves his/her head and the position of the eyes deviates from the "small area", the observer 11 can no longer visually recognize the magnified virtual image 12. By diffusing the pixel displaying beam as described above, the laser beam reflected at the transmission and reflection member 10 irradiates a "wide area in the proximity of the observer 11".

Accordingly, even if the observer 11 "slightly moves his/her head", the observer can visually recognize the magnified virtual image with reliability.

In the present embodiment, the pixel display beam LC enters the microlens array element 8 as a parallel beam, and diverges after passing through the microlens array element 8.

In any image display apparatus that forms an image by scanning a to-be-scanned medium, such as a transmissive or reflective screen, with laser light, speckle noise occurs due to strong interference of the laser light as coherent light, so that a virtual image to be viewed irregularly flickers. To handle such a circumstance, a microlens array (micro-convex lens structure) in which a plurality of microlenses (micro-convex lenses) are arranged with a pitch close to the beam diameter of the laser light is used as the to-be-scanned medium in the scanning image display apparatus. With the use of such a microlens array, the intensity of the speckle noise is reduced while controlling the divergence angle of the laser light in any desired degree, thus increasing the visibility of a virtual image.

In the present embodiment, the microlens array element 8 has a "micro-convex lens structure" where a plurality of micro-convex lenses that diffuse the pixel displaying beam LC are arranged to be in close contact with each other at a pitch approximate to a pixel pitch".

The micro-convex lens is larger than the "beam diameter of a pixel displaying beam LC".

The minute convex lens is made larger than the "beam diameter of the pixel displaying beam LC" to reduce the coherent noise, as described with reference to FIG. 2 and FIG. 3.

Figure 2A:
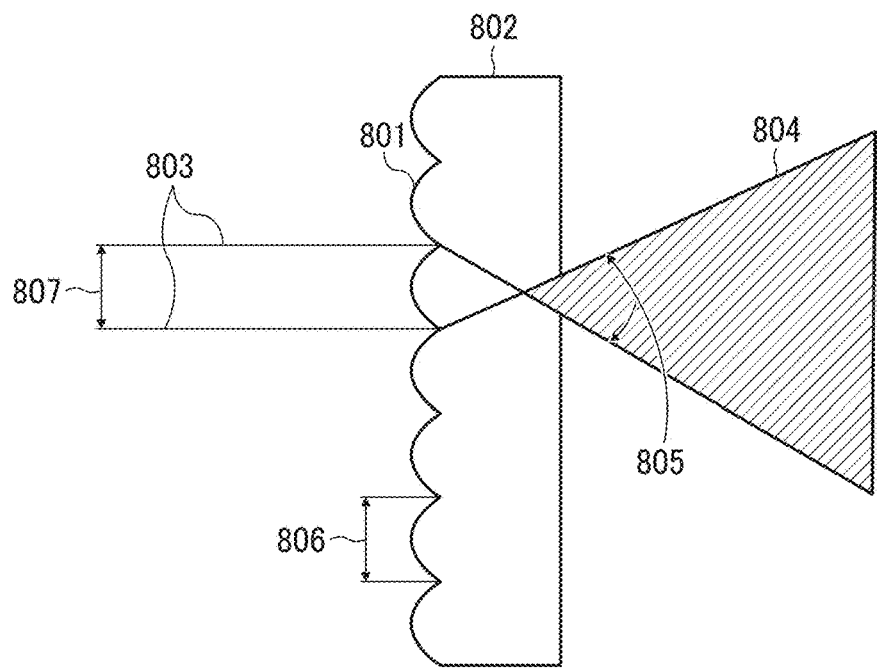
FIGS. 2A and 2B are illustrations of diverging light emitted from a micro-convex lens and the occurrence of coherent noise.

FIG. 2A illustrates a microlens array element 802. The microlens array element 802 has a micro-convex lens structure in which micro-convex lenses 801 (lenses or microlenses) are arranged. A laser-beam diameter 807 of a pixel displaying beam 803 is equal to or smaller than a size (diameter) 806 of each micro-convex lens 801. In other words, the size 806 of the micro-convex lens 801 is larger than the laser-beam diameter 807.

Note that, the pixel displaying beam 803 according to the present embodiment is a laser beam and has a light intensity distribution of a Gaussian distribution around the center of the laser beam.

Accordingly, the laser-beam diameter 807 is a distance in the radial direction of a laser beam where the light intensity in the light intensity distribution decreases to "1/e2".

In FIG. 2A, the laser-beam diameter 807 is drawn to have a size equal to the size 806 of each micro-convex lens 801. However, in some embodiments, the laser-beam diameter 807 may not be equal to the size 806 of the micro-convex lens 801.

The laser-beam diameter 807 is satisfactory as long as its size does not exceed the size 806 of each micro-convex lens 801.

In FIG. 2A, the entire pixel displaying beam 803 is incident on one micro-convex lens 801 and is converted to a diffused laser beam 804 having a divergence angle 805. Note that the "divergence angle" may be referred to as a "diffusion angle" in some cases.

In FIG. 2A, one laser beam is diffused (the diffused laser beam 804) without any interfering laser beam, and thus no coherent noise (speckle noise) occurs.

Note that the size of the divergence angle 805 may be set by adjusting the shape of the micro-convex lens 801 as appropriate.

Figure 2B:
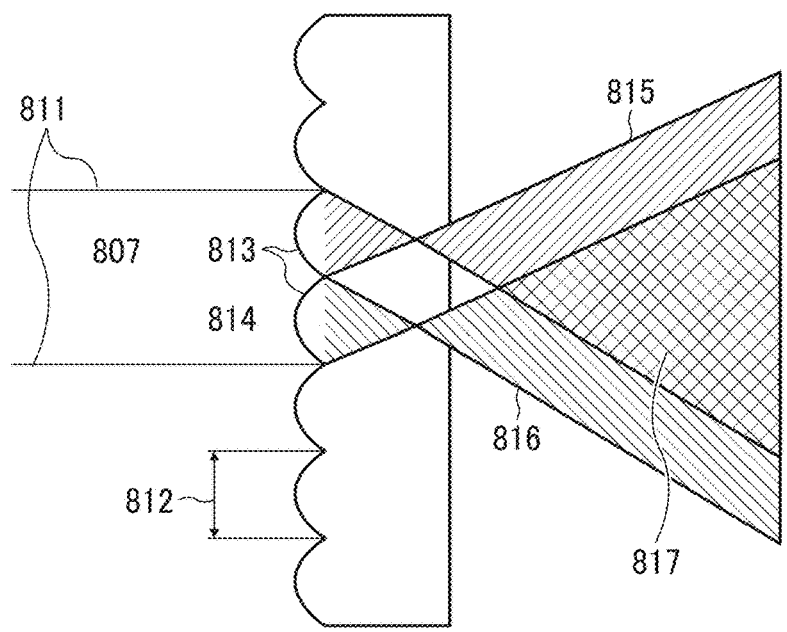

In FIG. 2B, the laser-beam diameter of the pixel displaying beam 811 is twice the array pitch 812 of the micro-convex lenses, and the pixel displaying beam 811 enters both micro-convex lenses 813 and 814.

In this case, the pixel displaying beam 811 passes through the two micro-convex lenses 813 and 814, thereby separating into two laser beams 815 and 816 each of which diverges.

The two laser beams 815 and 816 overlap each other in an area 817 to interfere with each other therein, so that coherent noise occurs.

Figure 3A:
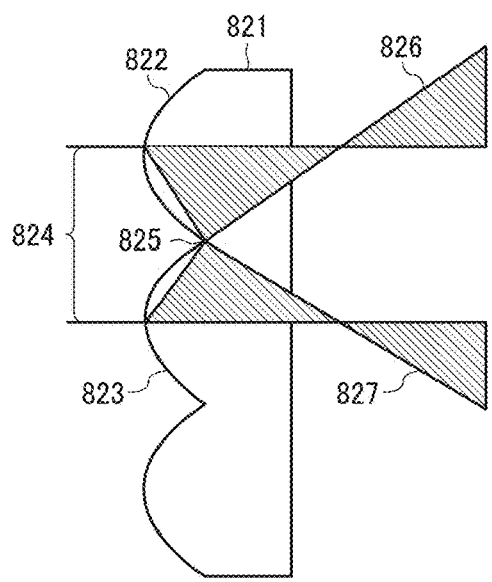
FIGS. 3A through 3C are illustrations for describing the elimination of the coherent noise.

In FIG. 3A, the pixel displaying beam 824 enters portions of micro-convex lenses 822 and 823 of the microlens array element 821.

The laser-beam diameter of the pixel displaying beam 824 is equal to the size of the micro-convex lens 822 or the like. In this case, the beam portion incident on the micro-convex lens 822 becomes a dispersed laser beam 826 to be diffused, and the beam portion incident on the micro-convex lens 823 becomes a dispersed laser beam 827 to be diffused.

The dispersed laser beams 826 and 827 are diffused in such a direction that the beams 826 and 827 are separated away from each other, and thus the beams 826 and 827 do not overlap each other. In such a state, coherent noise does not occur. In other words, if the beam diameter of the pixel displaying beam 824 is set to be equal to or smaller than the size of the micro-convex lens 822, the coherent noise due to the laser beams diffused by the micro-convex lens does not occur.

An example of specific numerical values of the diameter of the micro-convex lens and the beam diameter of the pixel displaying beam incident on the microlens array element is described. For example, the beam diameter of the pixel displaying beam is easily set to be about 150 μm.

In this case, the size of the micro-convex lens constituting the micro-convex lens structure is favorably set to be the above-described size of 150 μm or more, for example, 160 μm, 200 μm, or the like.

In the microlens array element 821 illustrated in FIG. 3A, the micro-convex lenses 822, 823, and so on are arranged, side by side, without gap.

Accordingly, a "width of the boundary portion (hereinafter, this may be referred to as a "boundary width") of the adjacent micro-convex lens surfaces is 0". For this reason, only the dispersed laser beams 826 and 827 are generated from the pixel displaying beam 824 that enters the micro-convex lenses 822 and 823 as illustrated in FIG. 3A.

However, in an actually-formed micro-convex lens structure, there is no case where the "boundary width between the adjacent micro-convex lenses is 0".

Figure 3B:
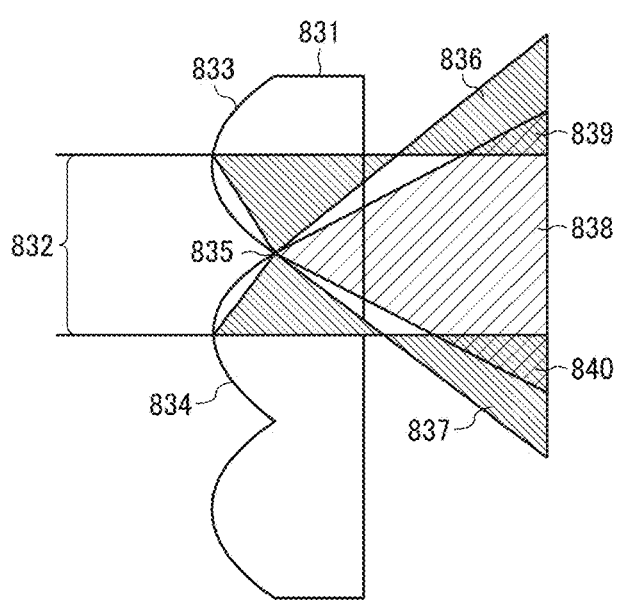

In other words, similarly to the microlens array element 831 illustrated in FIG. 3B, in an actually-formed micro-convex lens structure, there is no case where the "width of a boundary portion 835 between micro-convex lenses 833 and 834 is 0".

In the boundary portion 835 between the micro-convex lenses 833 and 834, microscopically, a "curved surface is formed to be smoothly continuous", and thus, a curved surface is formed in the boundary portion 835.

If the pixel displaying beam is incident on this portion, the curved surface formed in the boundary portion 835 in this manner functions as a "microlens surface" with respect to the incident light.

Accordingly, the pixel displaying beam 832 incident across the micro-convex lenses 833 and 834 causes a dispersed laser beam 838 as well as dispersed laser beams 836 and 837 to be generated. The dispersed laser beam 838 occurs due to the lens function of the curved surface of the boundary portion 835 and overlaps and interferes with the dispersed laser beams 836 and 837 in areas 839 and 840, so that coherent noise occurs.

Figure 3C:
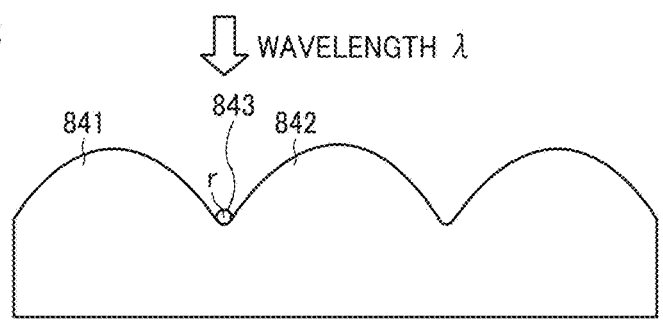

FIG. 3C is a diagram illustrating "reduction and prevention of the coherent noise" in a micro-convex lens structure, according to the present embodiment. In the micro-convex lens structure, a curved-surface shape itself of a boundary portion 843 where lens surfaces of micro-convex lenses 841 and 842 are gently connected forms a "microlens surface".

The radius of curvature of the curved-surface shape of the boundary portion 843 is denoted by r as illustrated in FIG. 3C.

In the present embodiment, for the purpose of simplification, a pixel displaying beam incident on the micro-convex lens structure is referred to as a "wavelength-λ monochrome laser beam". In a case where the radius of curvature r of the boundary portion 843 is larger than the wavelength λ of the pixel displaying beam (r>λ), the curved surface having a radius of curvature r has a lens function on the incident pixel displaying beam.

Accordingly, in this case, the beam component passing through the boundary portion 843 diverges and overlaps and interferes with the laser beams diffused by the micro-convex lenses 841 and 842, so that coherent noise occurs.

On the other hand, if the radius of curvature r of the boundary portion 843 is smaller than the wavelength λ, of the pixel displaying beam, the boundary portion 843 has a "sub-wavelength structure" with respect to the pixel displaying beam.

As known in the art, the sub-wavelength structure does not cause a lens function on the "light having a wavelength larger than the sub-wavelength structure". Accordingly, the boundary portion 843 having a radius of curvature r smaller than the wavelength λ does not function as a "lens" but straightly transmits the pixel displaying beam without divergence.

Accordingly, the beam portion straightly passing through the boundary portion 843 and the dispersed laser beams diffused by the micro-convex lenses 841 and 842 do not overlap each other, so that the coherent noise due to interference does not occur.

In other words, the order among the beam diameter d of the pixel displaying beam, the wavelength λ, the size D of the micro-convex lens, and the radius of curvature r of the surface constituting the boundary portion are favorably defined as follows.

$$D>d, \lambda>r.$$

In a case where the two-dimensional magnified virtual image which is to be displayed is monochrome image, the pixel displaying beam is formed by monochromatic coherent light having a wavelength λ.

Accordingly, in this case, the D, d, r, and λ are set so as to satisfy the above-described order, so that the coherent noise can be suppressed. Like the embodiment, in the case of displaying a two-dimensional color image (magnified virtual image), the pixel displaying beam LC is a combination of three R-color, G-color, and B-color beams.

When the wavelengths of the three beams are denoted by λR (=640 nm), λG (=510 nm), and λB (=445 nm), the order is that "λR>λG>λB".

Accordingly, with a view to preventing coherent noise, the radius of curvature r of the surface constituting the boundary portion is favorably set to be smaller than the shortest wavelength λB, for example, to be 400 nm.

However, if the radius of curvature r is set to be smaller than the longest wavelength λR (for example, to be 600 nm), the coherent noise due to the R component of the image display beam can be prevented. In other words, the coherent noise can be effectively reduced.

If "r (for example, 500 nm)<λG" is set, the coherent noise due to the R-component and G-component beams of the image display beam can be prevented.

In a case where the pixel displaying beam LC is a "combination of beams of three colors of red, green, and blue (RGB)", the coherent noise occurs independently with respect to the three color components.

The whole of the independent coherent noise due to the beams of three colors of red, green, and blue (RGB) becomes visually-recognizable coherent noise.

Accordingly, among the coherent noise due to three colors, if any coherent noise due to one color disappears, the visually-recognizable coherent noise is greatly improved, which contributes to improvement of image quality of an observation image.

Accordingly, with respect to the effect of prevention of coherent noise, the effect can be obtained in associated with only the "longest-wavelength R component" among the three color components, and next, the "reduction effect" is improved in the order of the G component and the B component.

Therefore, if the radius of curvature r is set to be smaller than the longest wavelength λR (for example, to be 600 nm), in addition to the reduction of coherent noise, a certain effect can be achieved.

With respect to the visibility of the coherent noise, noise intensity varies with the wavelength, the beam diameter, the multi/single modes, or the like, but in general, the visibility is increased in the order of R≈G>B.

In other words, the visibility of a human eye is low with respect to the light having a wavelength λB, and thus the coherent noise is difficult for human eye to visually recognize. Accordingly, if the radius of curvature r is set to be smaller than the wavelength λG (for example, to be 500 nm), the coherent noise due to the light having wavelengths λR and λG of which visibility is relatively high can be reduced.

Although the coherent noise due to the light having wavelength λB of which visibility is low occurs, the coherent noise is not securely visually recognizable.

As a matter of course, if the radius of curvature r is set to be smaller than the wavelength λB (for example, to be 400 nm), as described above, the coherent noise can be more effectively reduced.

Each size of the plurality of micro-convex lenses constituting the micro-convex lens structure is in the order of 100 μm as described above, and this can be implemented as a known "microlens".

In addition, the micro-convex lens structure where the plurality of micro-convex lenses is arranged can be implemented as a "microlens array".

For this reason, the micro-convex lens is sometimes may be referred to as a "microlens", and the micro-convex lens structure may be referred to as a "microlens array".

As known in the art, the microlens array is manufactured by producing a mold having a transfer surface of a lens surface array of the microlens array and transferring a mold surface to a resin material by using the mold.

With respect to formation of the transfer surface of the mold, there is well known a method of forming the transfer surface by using cutting, photolithography, and the like.

In addition, the transferring of the transfer surface to the resin material can be performed, for example, by injection molding.

The reduction of the radius of curvature of the boundary portion between the adjacent microlenses can be implemented by reducing the boundary width.

The small boundary width can be implemented by "sharpening" the boundary portion formed between the adjacent microlenses surfaces.

In the mold for microlens array, as a method of reducing the size of the "boundary width between the adjacent microlenses" down to the order of wavelength, there are known various methods.

In a comparative example, a method is described that includes increasing the radius of curvature of each microlens by anisotropic etching and ion processing to remove non-lens portions of the boundary portion.

In another comparative example, a method is described that includes removing a flat surface between adjacent microlenses by using isotropic dry etching.

For example, by using the above-described well-known methods, it is possible to manufacture a microlens array where the radius of curvature of the surface constituting the boundary portion between the adjacent microlenses is sufficiently small.

In other words, the above-described microlens array element can be configured as a microlens array having a structure where a plurality of microlenses are arranged to be in close contact with each other.

By forming the microlens array where the radius of curvature r of the surface constituting the boundary portion between the adjacent microlenses is smaller than 640 nm, the coherent noise due to the R component beam can be prevented.

In addition, by forming the microlens array where the radius of curvature r is smaller than 510 nm, the coherent noise due to the R component beam and the G component beam can be prevented.

By forming the microlens array where the radius of curvature r of the surface constituting the boundary portion between the adjacent microlenses is smaller than 455 nm, the coherent noise due to the R, G, and B component beams can be prevented.

Previously, the image display apparatus (heads-up display) illustrated in FIG. 1A to FIG. 1C was described.

The concave mirror 7 illustrated in FIG. 1A to FIG. 1C has a "function of removing the distortion of the image formed on the transmission and reflection member 10 by the pixel displaying beam LC which is two-dimensionally deflected".

In other words, the concave mirror 7 functions as a deflection range restriction means of restricting a scan range of the microlens array element by adjusting a deflection range of the pixel displaying beam which is two-dimensionally deflected.

In a case where a deflection angle of the pixel displaying beam which is two-dimensionally deflected by the two-dimensional deflector 6 is not greatly large, the deflection range restriction means may be omitted.

Conditions of the micro-convex lens structure (microlens array) and the micro-convex lenses (microlenses) are the same as those described above.

In other words, a micro-convex lens structure is configured so that a plurality of micro-convex lenses which are equal to or larger than a beam diameter of a pixel displaying beam are arranged to be in close contact with each other at a pitch approximate to a pixel pitch.

Figure 4A:
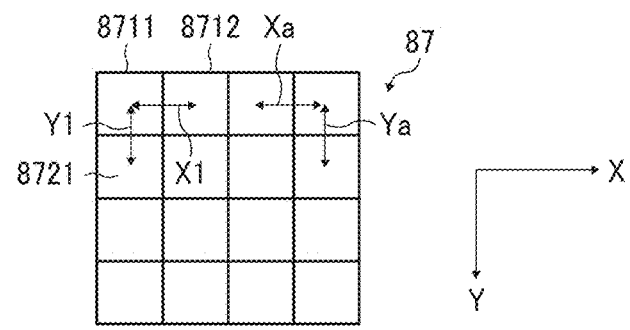
FIGS. 4A through 4C are illustrations of three examples of array forms of micro-convex lenses.
Figure 4B:
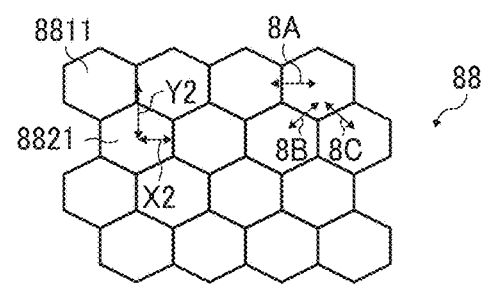
Figure 4C:
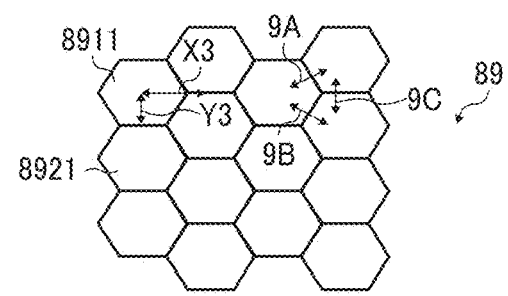

Herein, three examples of specific forms of the microlens array satisfying the conditions are illustrated in FIGS. 4A to 4C.

A microlens array 87 as a form example illustrated in FIG. 4A is configured so that square-shaped microlenses 8711, 8712, and so on or the like are arranged in a square matrix shape.

The number of pixels of a two-dimensional image (magnified virtual image) displayed in the heads-up display is determined by an arrangement cycle of the microlenses in the microlens array.

In the array of FIG. 4A, the distance between the centers of microlenses 8711 and 8712 adjacent to each other in the X-axis direction is denoted by X1.

Moreover, in FIG. 4A, the distance between the centers of the microlenses 8711 and 8721 adjacent to each other in the Y-axis direction is denoted by Y1. The X1 and Y1 can be regarded as an "effective size of one pixel".

In the following description, the "effective size of one pixel" may be referred as an "effective pitch of one pixel" or an "effective pixel pitch".

A microlens array 88 as a form example illustrated in FIG. 4B is configured so that regular hexagonal-shaped microlenses 8811, 8821, and so on are arranged to be in close contact with each other.

In the microlens array of this case, the arranged microlenses 8811 and the like do not have sides parallel to the X-axis direction. In other words, since upper sides and lower sides of the microlenses arranged in the X-axis direction have a "zigzag shape", the array is called a "zigzag-type array".

A microlens array 89 as a form example illustrated in FIG. 4C is configured so that regular hexagonal-shaped microlenses 8911, 8921, and so on are arranged to be in close contact with each other.

In the microlens array of this case, the arranged microlenses 8911 and the like have sides parallel to the X-axis direction. The array of this case is called an "armchair-type array". The zigzag-type array and the armchair-type array may collectively be called a "honeycomb-type array".

The armchair-type array illustrated in FIG. 4C is an array obtained by rotating the zigzag-type array illustrated in FIG. 4B by 90 degrees. In the zigzag-type array, X2 illustrated in FIG. 4B can be regarded as an "effective pixel pitch in the X-axis direction", and Y2 can be regarded as an "effective pixel pitch in the Y-axis direction".

In the armchair-type array, X3 illustrated in FIG. 4C can be regarded as an "effective pixel pitch in the X-axis direction", and Y3 can be regarded as an "effective pixel pitch in the Y-axis direction".

In FIG. 4B, the effective pixel pitch Y2 is a distance between the center of the microlens 8821 and the central point of the right side of the microlens 8811.

In FIG. 4C, the effective pixel pitch X3 is a distance between the central point of the side with which two microlenses contacting the right side of the microlens 8911 are in contact and the center of the microlens 8911.

In the zigzag-type array, since the effective pixel pitch in the X-axis direction X2 is small, the resolution in the image display in the X-axis direction can be improved.

In addition, in the armchair-type array, the resolution in the Y-axis direction can be improved.

As described above, by arranging the microlenses in a honeycomb type, the pixels which are smaller than an actual lens diameter can be effectively represented, so that the number of effective pixels can be increased.

As described above in the micro-convex lens structure (microlens array) of the microlens array element, the boundary portion between the adjacent microlenses has a radius of curvature r.

The radius of curvature r is smaller than, for example, the wavelength λR of the R component of the pixel displaying beam.

Accordingly, as described above, the "coherent noise due to interference of the coherent light of the R component" is prevented.

However, if the radius of curvature r is larger than the wavelength λG of the G component beam and the wavelength λB of the B component beam of the pixel displaying beam, these beams are diffused in the boundary portion to interfere with each other.

Accordingly, the coherent noise occurs due to the interference.

In this case, in the "square-matrix-shaped array" of FIG. 4A, the divergence (diffusion) in the boundary portion occurs in two directions of Xa and Ya directions of FIG. 4A, which causes the coherent noise.

By contrast, in the array of FIG. 4B, the divergence of the boundary portion occurs in three directions 8A, 8B, and 8C. In the case of FIG. 4C, the diffusion occurs in three directions 9A, 9B, and 9C.

In other words, in the square-matrix-shaped array, the divergence in the boundary portion occurs in two directions, and in the honeycomb-shaped array, the divergence occurs in three directions.

Accordingly, in the square-matrix-shaped array, the coherent noise occurs in two directions, and in the honeycomb-shaped array, the coherent noise occurs in three directions.

In other words, the generated coherent noise is "dispersed in two directions" in a square-matrix-shaped array, whereas the generated coherent noise is "dispersed in three directions" in a honeycomb-shaped array.

The maximum intensity of the coherent light generating the coherent noise is constant.

Accordingly, as the number of dispersion directions becomes large, the "contrast of the generated coherent noise" can be allowed to be weak, so that the coherent noise is difficult to visually recognize (inconspicuous).

Accordingly, in a case where the generation of the "coherent noise due to the component having a wavelength smaller than the radius of curvature r of the boundary portion" is not allowed, the microlens array is favorably set to a "honeycomb-shaped array".

When the boundary width is larger than the wavelength λR, the coherent noise due to the coherent light of the R component is also generated.

However, the "boundary width between the lens surfaces" of the adjacent micro-convex lenses is small, and the light energy of the coherent light incident on the portion having a small boundary width is small. Accordingly, the light energy generating the coherent noise is not large.

Moreover, even if the coherent noise is generated, even in the case of a honeycomb-shaped array, as described above, the coherent noise is dispersed in three directions, so that the contrast becomes weak.

Accordingly, the visibility of the coherent noise is effectively reduced.

As described with reference to FIG. 1A, a virtual image forming optical system that forms the two-dimensional magnified virtual image 12 is configured with the concave mirror 9.

In other words, the magnified virtual image 12 is a set of pixel images formed by the concave mirror 9.

If the microlenses as the micro-convex lenses are allowed to have an "anamorphic function", the diffusion function of the micro-convex lens can be allowed to be different between directions perpendicular to each other.

Figure 6A:
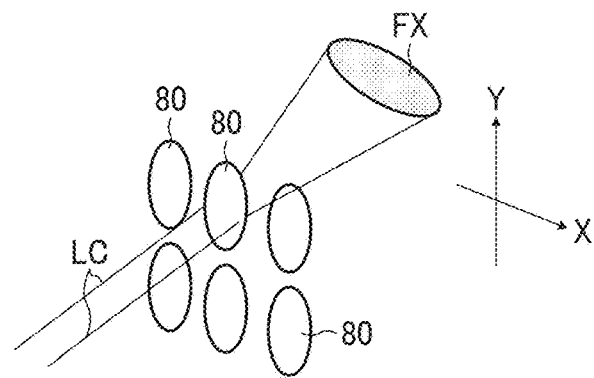
FIGS. 6A and 6B are illustrations of anamorphic micro-convex lenses.
Figure 6B:
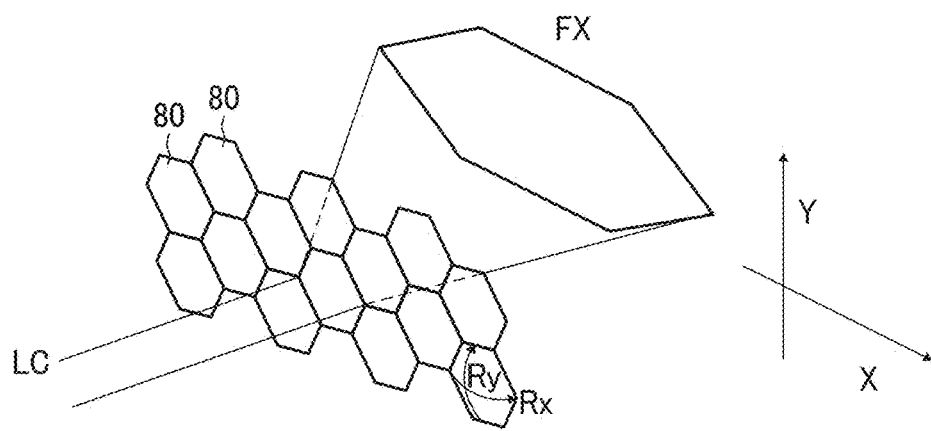

FIG. 6A and FIG. 6B are schematic diagrams each illustrating microlenses 8 (micro-convex lenses) that are formed to be in close contact with each other in the microlens array element 8. In the example of FIG. 6A, the micro-convex lenses have a vertically-elongated elliptic shape and are arranged in a matrix-shaped array (square-matrix-shaped array).

In the example of FIG. 6B, the micro-convex lenses 80 have vertically oriented hexagon shapes having sides parallel to the X-axis direction and are arranged in an "armchair-type array".

In the micro-convex lens 80, the radius of curvatures of the lens surface are different between the X-axis direction and the Y-axis direction, and the radius of curvature in the Y-axis direction Ry is smaller than the radius of curvature in the X-axis direction Rx. In other words, the curvature of the micro-convex lens 80 in the X-axis direction is greater than the curvature in the Y-axis direction.

Accordingly, the power (dispersing power) of the micro-convex lens 80 in the X-axis direction is greater than the power (dispersing power) in the Y-axis direction.

As the lens surface has curvatures in both of the X-axis direction and the Y-axis direction, as illustrated in FIG. 6B, the micro-convex lens can be formed to have a hexagon shape, so that the "visibility of the coherent noise" can be weakened as described above.

FIG. 6A and FIG. 6B illustrate the cases where the pixel displaying beam LC enters one of the micro-convex lenses 80. In FIG. 6A and FIG. 6B, the width of each of the micro-convex lens 80 in the Y-axis direction is wider than the width in the X-axis direction.

As illustrated in FIG. 6A, the pixel displaying beam LC is formed as an "elliptic shape where the beam diameter thereof is long in the Y-axis direction", and the laser-beam diameter in the X-axis direction is smaller than the diameter of the micro-convex lens 80 in the Y-axis direction.

In such a configuration, the pixel displaying beam LC can be allowed to be "incident without crossing the lens boundary", and the shape of the cross section of the emitting dispersed laser beams has a (horizontally-oriented) elliptic shape where the beam diameter is long in the X-axis direction.

If the curvature in the X-axis direction is greater than the curvature in the Y-axis direction irrespective of the length of the micro-convex lens in the Y-axis direction and the X-axis direction, in the cross-section FX of a laser beam of the diverging beam emitted from each micro-convex lens, the diameter in the Y-axis direction is longer than the diameter in the X-axis direction. In other words, the beam is horizontally oriented.

The HUD as described above may be provided, for example, for a vehicle such as a car, and the X-axis direction and the Y-axis direction indicate "the right and left directions with reference to a driver's seat" and "the up-and-down directions with reference to the driver's seat", respectively.

In the present embodiment, the transmission and reflection member 10 is a front windshield of a vehicle. This windshield may be treated, if desired, in a conventional manner so that it can better display the image provided from the heads-up display unit According to the present example embodiment, for example, a "navigation image" can be displayed ahead of the front windshield as the magnified virtual image 12, and a driver as the observer 11 can observe such a navigation image without moving his/her line of vision away from the ahead of the front windshield while staying in the driver's seat.

In such an embodiment, it is desired that the magnified virtual image be a "horizontally-oriented image when seen from a driver", as described above. In other words, it is desired that the image formed on a microlens and the magnified virtual image be an image whose angles of view is wider in the X-axis direction.

It is also desired that "the viewing angle be wider in the lateral direction than in the vertical direction" such that a driver as the observer can recognize the displayed image even in a slanting direction from the right and left sides.

For this reason, a greater diffusion angle (anisotropic diffusion) is required for the longer-side direction (i.e., X-axis direction) of the magnified virtual image, with reference to the shorter-side direction (i.e., Y-axis direction) of the magnified virtual image.

Accordingly, it is desired that the minute convex lenses of the microlens array element be anamorphic lenses whose curvature is greater in the longer-side direction than in the shorter-side direction of an image formed on a microlens or a magnified virtual image, and that the diffusion angle of the pixel displaying beam be "wider in the lateral direction than in the vertical direction of a two-dimensional image".

As described above, according to the example embodiment of the present disclosure, the utilization efficiency of light and the brightness of display image can be improved as the light is dispersed to a minimum area that satisfies the desired angle of view of a HUD.

As a matter of course, "isotropic diffusion" in which the diffusion angle is equal between the lateral direction and the vertical direction may be applied instead of the "anisotropic diffusion" described above.

However, as long as a vehicle-installed HUD for a car or the like is concerned, there are few cases in which the driver observes a displayed image from up-and-down directions.

Accordingly, as long as a vehicle-installed HUD is concerned, it is desired that the diffusion angle of the pixel displaying beam be "wider in the lateral direction than in the vertical direction of a two-dimensional image" as described above in view of the utilization efficiency of light.

Conventionally, it is known that the surface of a minute convex lens (microlens) can be formed as "aspherical surface". The anamorphic lens has "aspherical surface", and the use of such an anamorphic lens enables the aspherical surface of a minute convex lens as desired. Moreover, the use of the anamorphic lens can perform aberration correction. Due to the aberration correction, "nonuniformity in diffusion intensity" may be reduced.

Each of the micro-convex lenses (microlenses) in the micro-convex lens structure (microlens array) FIG. 4A to FIG. 4C has a square shape or a regular hexagon shape.

The shape of the micro-convex lens is not necessarily a regular polygon shape as described above, but shapes obtained by stretching the shapes of the microlenses illustrated in FIG. 4A to FIG. 4C in one direction may also be available.

In this case, the square shape becomes a "rectangle shape", and the regular hexagon shape becomes an elongated deformed polygon shape.

With respect to the effective pixel pitch of the micro-convex lens structure, in the arrays of FIG. 4A to FIG. 4C, the effective pixel pitches in the X-axis direction are denoted by X1 to X3, and the effective pixel pitches in the Y-axis direction are denoted by Y1 to Y3.

When the effective pixel pitch in the X-axis direction defined as described above is denoted by "SX" and the effective pixel pitch in the Y-axis direction defined as described above is denoted by "SY", a ratio SY/SX of the both effective pixel pitches is referred to as an "aspect ratio".

In the case of FIG. 4A, since the aspect ratio is "Y1/X1" and X1=Y1, the aspect ratio is 1. In the case of FIG. 4B, since the aspect ratio is "Y2/X2" and Y2>X1, the aspect ratio is larger than 1. In the case of FIG. 4C, since the aspect ratio is "Y3/X3" and Y3<X3, the aspect ratio is smaller than 1.

In micro-convex lens structures of microlens arrays 91 to 94 illustrated in FIG. 5A to FIG. 5E, similarly to the cases of FIG. 4A to FIG. 4C, the effective pixel pitches are defined as follows. In other words, the effective pixel pitches in the X-axis direction and Y-axis direction are "X11 and Y11", "X12 and Y12", and "X13 and Y13" of FIG. 5A to FIG. 5D.

Figure 5A:
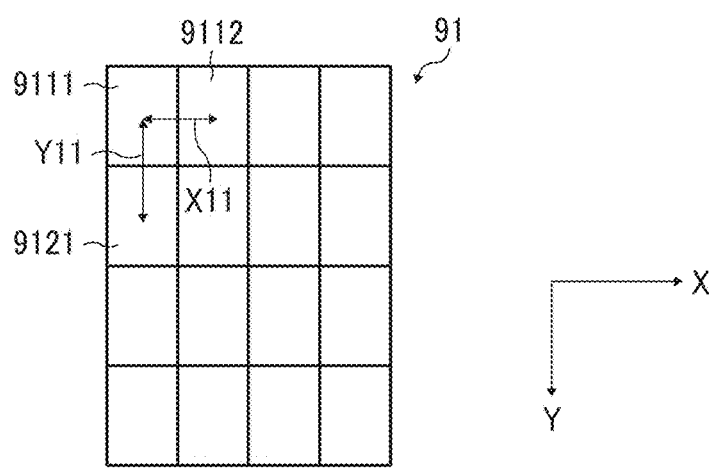
FIGS. 5A through 5D are illustrations of five examples of array forms of micro-convex lenses.

In the micro-convex lens structure of FIG. 5A, rectangle-shaped micro-convex lenses 9111, 9112, ..., 9121, and so on are arranged in a square matrix shape, and the aspect ratio is larger than 1.

In the microlens arrays 92 to 94 illustrated in FIG. 5B to FIG. 5E, the micro-convex lens structures are honeycomb-type arrays. In the honeycomb-type arrays FIG. 5B through FIG. 5D, all the aspect ratios "Y12/X12" and "Y13/X13" are greater than 1.

In the "micro-convex lens" of any one of the four examples of the micro-convex lens structures illustrated in FIG. 5A to FIG. 5D, the length in the Y-axis direction is larger than the length in the X-axis direction.

In this manner, in the case of "the micro-convex lens having a shape where the length in the Y-axis direction is larger than the length in the X-axis direction", as the shape of the micro-convex lens, the curvature in the X-axis direction is easily set to be larger than the Y-directional curvature. Accordingly, the above-described "anamorphic optical function where the power in the X-axis direction is greater than the power in the Y-axis direction" can be easily implemented.

For example, in the case of the example illustrated in FIG. 5A, as a specific example, there is an example where X11=150 μm, Y11=200 μm, and aspect ratio=200/150=4/3>1. As a matter of course, in this case, the beam diameter of the pixel displaying beam in the X-axis direction is set to be less than 150 μm, and beam diameter in the Y-axis direction is set to be less than 200 μm.

Figure 5B:
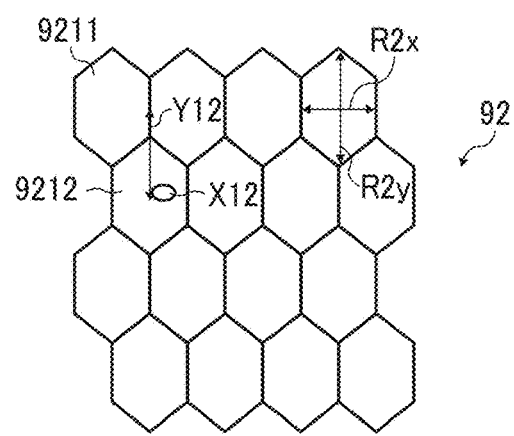
Figure 5C:
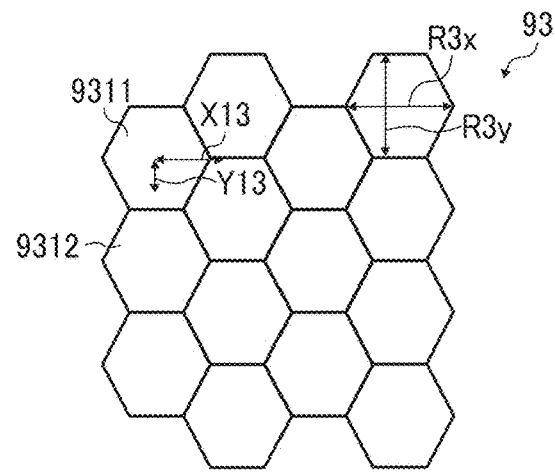
Figure 5D:
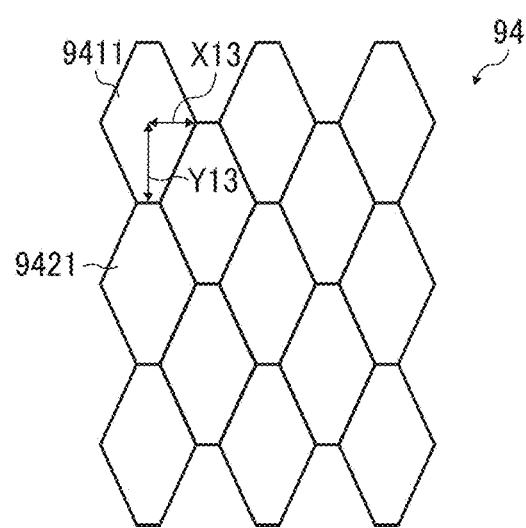

Any one of the arrays of micro-convex lenses FIG. 5B through FIG. 5D is a honeycomb-type array, and each micro-convex lens has a "elongated shape in the Y-axis direction".

The array of FIG. 5B is a "zigzag-type", and any one of the arrays of FIG. 5C and FIG. 5D is an "armchair-type".

As a matter of course, any one of the "zigzag-type vertically-elongated honeycomb-type array" of FIG. 5B and the "armchair-type vertically-elongated honeycomb-type array" of FIGS. 5C and 5D can be available.

However, the array example of FIG. 5C has the following advantages in comparison with the array example of FIG. 5B.

In other words, in comparison with the array of FIG. 5B, in the array of FIG. 5C, a "difference between the sizes in the X-axis direction and the Y-axis direction" of the micro-convex lens is small, and a "difference between the effective pixel sizes" in the lateral and vertical directions is small.

Specific sizes (numeric values) are given below. For example, in FIG. 5B, with respect to the micro-convex lenses 9211, 9212, and the like, the lens diameter in the X-axis direction is set to be R2x=100 μm, and the lens diameter in the Y-axis direction is set to be R2y=200 μm.

In such cases, the effective pixel pitch in the X-axis direction (=X12) becomes 50 μm, and the effective pixel pitch (=Y12) in the Y-axis direction becomes 150 μm.

In a similar manner, in FIG. 5C, with respect to the micro-convex lenses 9311, 9312, and the like, the lens diameter in the X-axis direction is set to be R3x=100 μm, and the lens diameter in the Y-axis direction is set to be R3y=200 μm.

The lengths of the upper and lower sides of the hexagon shapes of the micro-convex lenses 9311 and the like are set to be 50 μm.

In such cases, the effective pixel pitch (=X13) in the X-axis direction becomes 75 μm, and the effective pixel pitch (=Y13) in the Y-axis direction becomes 100 μm.

Accordingly, the "effective pixel pitches in the X-axis direction and the Y-axis direction" of the case of the array (75 μm and 100 μm) of FIG. 5C become "closer values" than those of the case of the array (50 μm and 150 μm) of FIG. 5B.

In FIG. 5C and FIG. 5D, the effective pixel pitch in the X-axis direction is denoted by X13, and the effective pixel pitch in the Y-axis direction is denoted by Y13.

This is in accordance with the fact that, in the honeycomb-type arrays (armchair-type honeycomb-type arrays) of FIG. 5C and FIG. 5D, the pixel pitch in the X-axis direction and the pixel pitch in the Y-axis direction are defined to be equal to each other.

In FIG. 5D, with respect to micro-convex lenses 9411, 9421, and the like, the upper and lower sides parallel to the X-axis direction are short, and the inclined sides are long.

As illustrated in these drawings, by deformation of the hexagon shape of the micro-convex lens, the pixel pitch in the X-axis direction X13 and the pixel pitch in the Y-axis direction Y13 can be adjusted.

In the heads-up display illustrated in FIG. 1A, the pixel displaying beam LC is perpendicularly incident on the micro-convex lens structure of the microlens array element 8.

However, the form of the incidence of the pixel displaying beam on the microlens array element is not limited to the "perpendicular incidence".

Figure 7A:
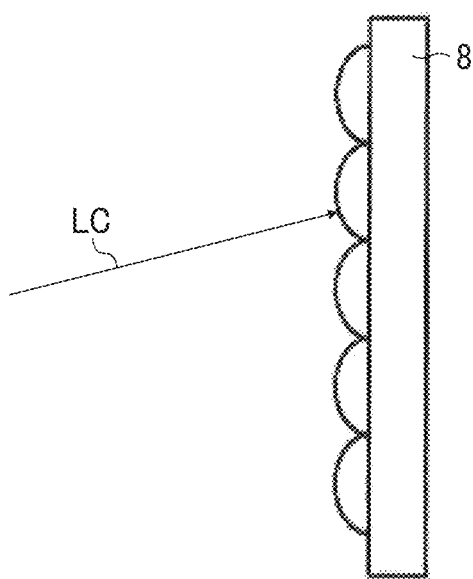
FIGS. 7A and 7B are illustrations of two examples of microlens array elements.

For example, in the case of miniaturizing the heads-up display by studying arrangement of optical elements ranging from the light source unit to the reflection plane, an incidence form as illustrated in FIG. 7A is considered.

In other words, in an example of FIG. 7A, the pixel displaying beam LC is incident to be inclined with respect to the microlens array element 8.

In a case where the lens surface of the micro-convex lens is set to be an "aspherical surface", the pixel displaying beam LC is incident to be inclined with respect to the optic axis of the aspherical surface, and thus, in some cases, the function of the aspherical surface cannot be implemented.

Figure 7B:
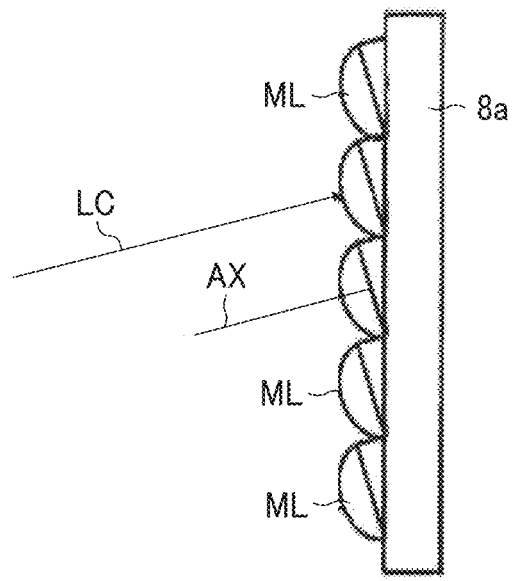

In this case, similarly to a microlens array element 8a of FIG. 7B, it is preferable that a lens surface optic axis AX of the micro-convex lens ML is set to be inclined from the perpendicular direction with respect to a reference surface of the microlens array element 8a.

By so doing, the lens surface optic axis AX can be allowed to be parallel to the incident direction of the pixel displaying beam LC or to be close to the incident direction.

Note that the reference surface of the microlens array element 8a is a surface of an array where the micro-convex lenses ML are arranged.

By doing so, the downsizing of the optical system or the improvement of the utilization efficiency of light can be implemented, so that the "divergence direction of the pixel displaying beam by the micro-convex lens" can be allowed to be homogenized.

The application of the HUD according to the example embodiment of the present disclosure is not limited to a car as described above, but the HUD may be applied to various kinds of operable mobile objects such as trains, ships, helicopters, and aircrafts. For example, a windshield (windbreak) of a motorbike can be configured as a transmitting/reflecting member.

In this case, a front windshield ahead of the cockpit may be configured as a reflection plane.

As a matter of course, the HUD according to the present example embodiment may be implemented, for example, as an "image display apparatus for movie viewing".

The minute convex lenses in the minute convex lens arrangement diffuse the pixel displaying beam as described above, but may diffuse the pixel displaying beam only in one direction between the X direction and the Y direction.

In such cases where diffusion is performed only in a single direction, "minute convex cylinder surface" may be applied to the lens surface of the minute convex lenses.

The shape of the minute convex lens may be shaped as a hexagon, and the minute convex lenses may be arranged like a honeycomb. Such variations are conventionally known in the art of microlens array manufacturing method.

When the microlens array in which lenses are periodically arranged is used as a microlens array element, such as a transmissive screen or a reflective screen, of an optical device, e.g., a HUD, an interference pattern such as moire and diffraction pattern due to diffracted light that is strengthened in a certain direction is visually recognized on the microlens array, which is known in the art. In other words, the occurrence of such an interference pattern reduces the visibility of an image and a virtual image formed by the microlens array element.

In the present embodiment, the expression "the microlens array in which lenses are periodically arranged" refers to a microlens array (hereinafter, referred to also as a periodically-arranged lens array) with the pitch (hereinafter, referred to as a lens pitch) of vertices of a plurality of microlenses, i.e., the distance between the vertices of adjacent microlenses is periodic (for example, constant).

The "vertices of the microlenses" refers to the position of the vertex of a lens surface of each microlens within the XY plane. The "vertex of a lens surface of each microlens" refers to a point at which the lens surface of each microlens intersects with the optic axis (which is parallel with the Z axis in the present embodiment) of the microlens.

Specific examples of the periodically-arranged lens array include a lens array in which the vertex (i.e., the position at which the length in the Z-axis direction is maximum) of each microlens coincides with the center of gravity of each microlens, the pitch (lens pitch) of the vertices (the centers of gravity) of microlenses are constant, and the lens diameter (lens size) of each microlens is constant. In the present embodiment, the optic axis of each microlens passes through the center of gravity of the microlens. In such a case, a fringe pattern in which the interference pattern, the direction of interference fringe, and the pitches are uniformly formed, is visually recognized.

The "center of gravity of each microlens" refers to the position of the gravity of a microlens projected onto the XY plane.

In an example periodically-arranged lens array, a plurality of microlenses each having a rectangular planar shape of the same size are arranged such that the lens pitch of the plurality of microlenses is constant. In such a lens array, interference fringes are visually recognized in both a horizontal direction and a vertical direction. In another example periodically-arranged lens array, a plurality of microlenses each having a hexagon-honeycomb planar shape of the same size are arranged such that the lens pitch of the plurality of microlenses is constant. In such a lens array, interference fringes are visually recognized in three directions of sixfold symmetry.

In view of the above, using the microlens array with each microlens having a lens diameter equal to or larger than a beam diameter can reduce or prevent the interference of diverging beams emitted from adjacent microlenses. However, even with the use of such a microlens array, very little interference still remains due to the widely spreading of the diverging beams, which is visually recognized as the interference pattern with a high visibility because the direction and the pitch of the interference pattern are uniformed.

To reduce the occurrence of such an interference pattern, the periodicity of the interference pattern is removed to reduce the visibility of the interference pattern.

As described above, the periodic interference pattern with uniformed pitch and direction occurs in the periodically-arranged lens array due to the periodic arrangement of microlenses. Accordingly, removing the periodicity of the lens (microlens) arrangement of the microlens array, i.e., making the lens pitch random (non-periodic), can reduce or prevent the occurrence of the interference pattern.

Figure 8:
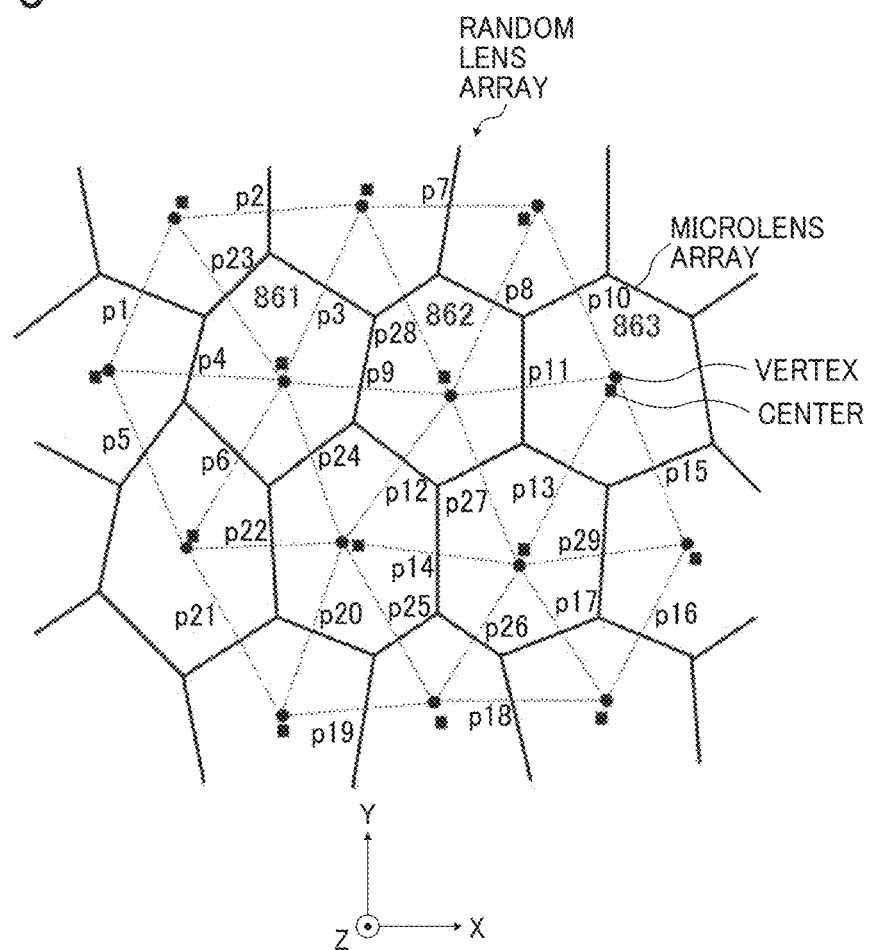
FIG. 8 is an illustration of a randomly-arranged lens array.
Figure 9:
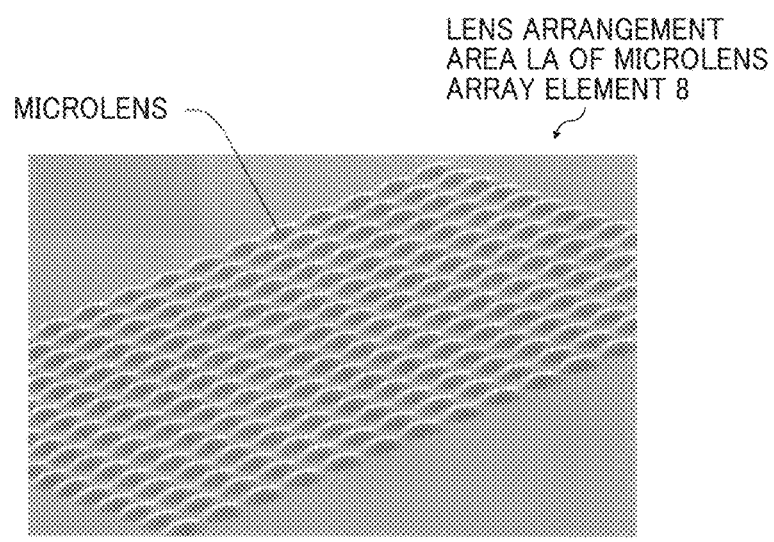
FIG. 9 is a perspective view of a lens arrangement area of a microlens array element as an example.

FIG. 8 is an illustration of a microlens array (hereinafter, referred to also as a randomly-arranged lens array) with randomized lens pitches. Such a randomly-arranged lens array has a structure obtained by randomly shifting (offsetting) the optic axis of each microlens to a direction perpendicular to the optic axis (the Z axis) of the periodically-arranged lens array in which the vertex of each microlens coincides with the center of gravity thereof. In other words, the randomly-arranged lens array has a structure in which the lens pitches are irregular. In this case, the optic axis of each microlens passes through the vertex of the same microlens, failing to pass through the center of gravity of the same microlens. Note that, the center of gravity of each microlens of the randomly-arranged lens array in FIG. 8 may be the center of a circle that passes through at least three points at the outer edge of the same microlens and encloses the same microlens. Alternatively, in some embodiments, the center of gravity of each microlens of the randomly-arranged lens array in FIG. 8 may be the center of a circle that contacts at least three sides of the same microlens and is enclosed by the same microlens.

In such a microlens array in which the lens pitches and the directions of borderlines between microlenses are randomized (non-periodic) as illustrated in FIG. 8 for example, an interference pattern that occurs between adjacent microlenses 861 and 862 or adjacent microlenses 862 and 863 has different directions and pitches, which is not visually recognized as the interference pattern having uniformed direction and pitch when macroscopically observed. That is, randomizing the lens pitches of microlenses reduces the occurrence of an interference pattern, and randomizing the directions of borderlines between microlenses disperses the interference intensity of diverging beams (hereinafter, referred to also as adjacent diverging beams) emitted from adjacent microlenses.

In the randomly-arranged lens array in FIG. 8, for example, lens pitches p1 through p29 all may differ from each other. Alternatively, some of the lens pitches p1 through p29 may be the same and the remaining pitches may differ from each other. In other words, the randomly-arranged lens array according to at least one embodiment is satisfactory as long as the lens pitches are irregular. In FIG. 8, a black dot refers to the vertex of each microlens. Further, a black square refers to the center of gravity of each microlens.

Preferably, the lens pitches ( . . . p4, p9, p11 . . . ), ( . . . p23, p24, p25 . . . ), ( . . . p8, p12, p20 . . . ), and so on, each set of which is arranged in the same direction of lens arrangement, are irregular (non-periodic).

The microlens array element made of resin, such as the microlens array element 8, is produced by injection molding. The injection molding is performed by using an injection molding device and a mold as cited on the website http://www.polyplastics.com/jp/support/mold/outline/.

The injection molding device includes a mold clamping unit and an injection unit. The mold clamping unit opens and closes the mold, and projects the mold. The mold clamping unit has a toggle system and a direct-pressure system that directly opens and closes the mold by a hydraulic cylinder.

The injection unit heats and melts resin (thermoplastic resin) to inject the resin into the mold. More specifically, the injection unit causes a motor to rotate a screw within a cylinder, and collects (which is referred to as "measurement") resin supplied to the cylinder through a hopper in the front part of the screw, up to the stroke equivalent to a determined amount of resin, injecting the collected resin. The injection unit controls the speed of movement of the screw (injection speed) while resin flows within the mold, and controls pressure (hold pressure) after the resin is filled in the mold. The injection unit is designed to switch between a speed control and a pressure control when the screw reaches a given position or the pressure reaches a given injection pressure.

The mold includes a lens arrangement forming unit and a gate unit. The lens arrangement forming unit has a transfer surface formed over the inner wall surface to form a lens arrangement area having a substantially flat-plate shape. The lens arrangement area has a plurality of micro-convex lenses (microlenses) two-dimensionally arranged over the entire surface thereof in the microlens array element. The gate unit allows resin to be supplied into the lens arrangement area forming unit. The gate unit has an entrance coupled to the exit of the cylinder of the injection unit. Note that a plurality of microlenses having a circular or elliptic shape is arranged in matrix (a square-matrix) in the planar view.

A description is given of a method for forming a microlens array element according to a comparative example by injection molding, referring to FIG. 10A through FIG. 10D. Note that a mold for forming a microlens array element according to the comparative example has a gate unit having a straight shape (a rectangular shape in a planar view) (see FIG. 10B). The expression "planar view" refers to a view when viewed from the Z-axis direction that is a normal direction that passes through the center of the lens arrangement area in the present disclosure.

Figure 10A:
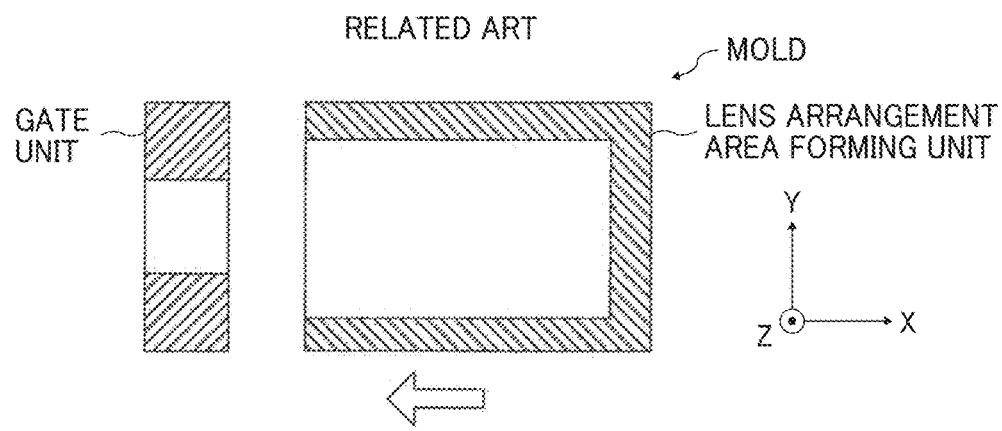
FIGS. 10A through 10D are illustrations of a procedure for producing a microlens array element according to a comparative example by molding injection.

Firstly, a mold clamping process is performed (see FIG. 10A). More specifically, a mold clamping unit presses the lens arrangement area forming unit against the gate unit so that the mold is closed.

Figure 10B:
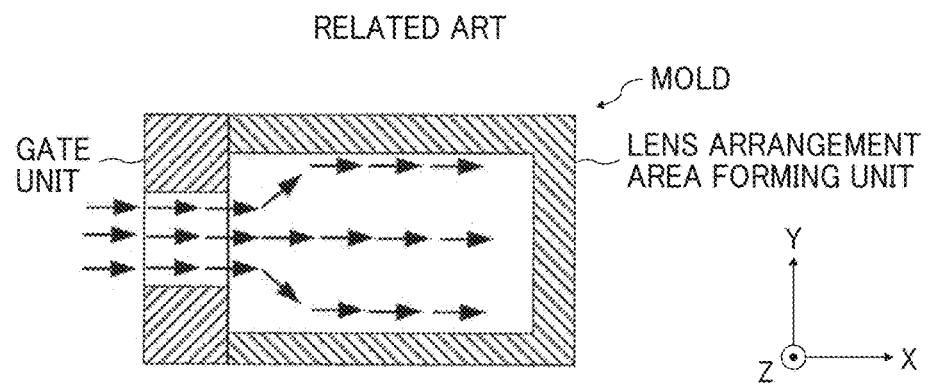

Next, an injection process is performed (see FIG. 10B). More specifically, the injection unit injects heated and melted resin material into the mold. The resin flows within the mold as indicated by arrows in FIG. 10B.

Figure 10C:
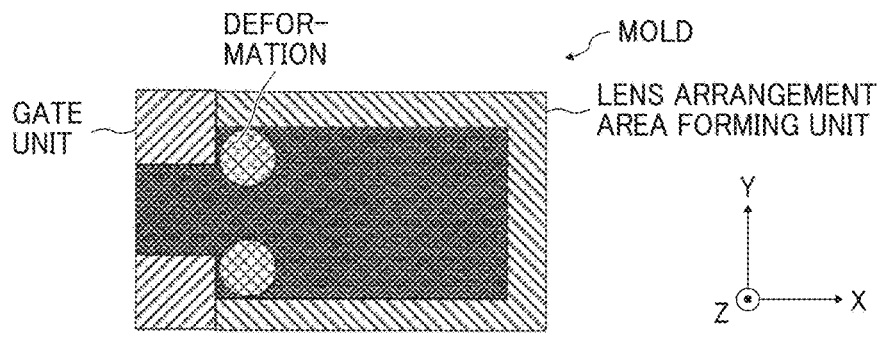
Figure 10D:
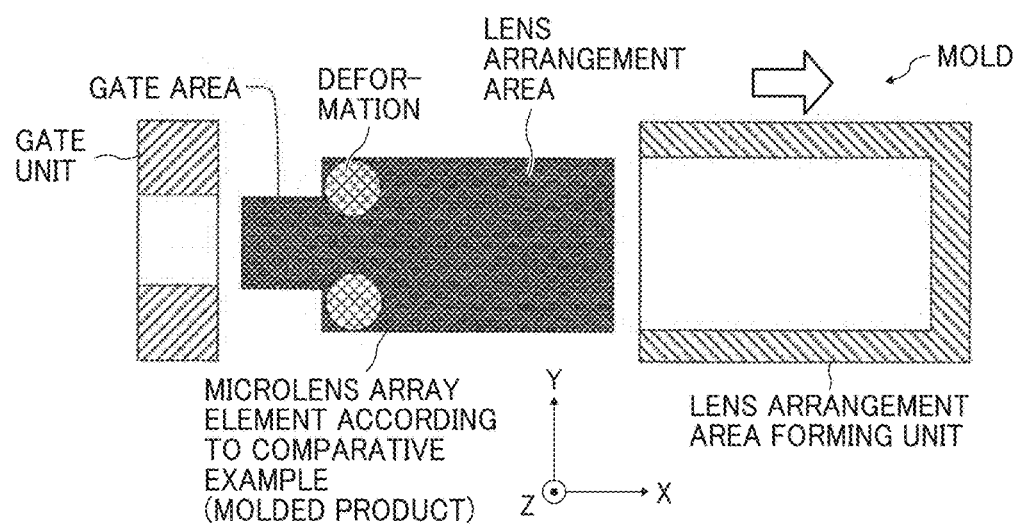

Next, a pressure-holding, cooling and solidifying processes are performed (see FIG. 10C).

Finally, the mold is opened and a molded product is taken out. More specifically, the mold clamping unit moves away the lens arrangement area forming unit from the gate unit so that the mold is opened and the molded product is ejected from the mold. Thus, a molded product, i.e., a microlens array element according to the comparative example, is obtained that includes a lens arrangement area having a rectangular shape in the planar view and a gate area having a rectangular shape in the planar view. The gate area is formed in the gate unit, having a shape (the rectangular shape in the planar view) that corresponds to the shape of the inner wall surface of the gate unit.

In the injecting method according to the comparative example, the resin irregularly (ununiformly) flows at a corner on a −X side and a +Y side and at another corner on the −X side and a −Y side within the lens arrangement forming unit (the forming unit) (see FIG. 10B) in the process of filling the mold with resin under high pressure. This causes a large deformation at corresponding positions in the molded product as indicated by shaded circles in FIG. 10C and FIG. 10D.

Accordingly, the present inventors have conceived of a mold M with a gate unit G having an improved-shaped passage for inserting resin into the mold M. More specifically, the inner wall surface of the gate unit G of the mold M has a shape (for example, an isosceles trapezoid shape) that gradually increases in width (Y-axis-directional width) in a direction that approaches a lens arrangement area forming unit F (a forming unit) in the planar view, i.e., viewed from the Z-axis direction (see FIG. 11A through FIG. 11D). Hereinafter, such a mold M is referred to as an improved mold M. In the present embodiment, injection molding is performed using the improved mold M.

The following describes an injection molding method using an improved mold M according to the present embodiment, referring to FIG. 11. The steps of the injection molding method using the improved mold M is basically the same as those illustrated in FIG. 10A through FIG. 10D. FIG. 11A through FIG. 11D correspond to FIG. 10A through FIG. 10D, respectively.

Figure 11A:
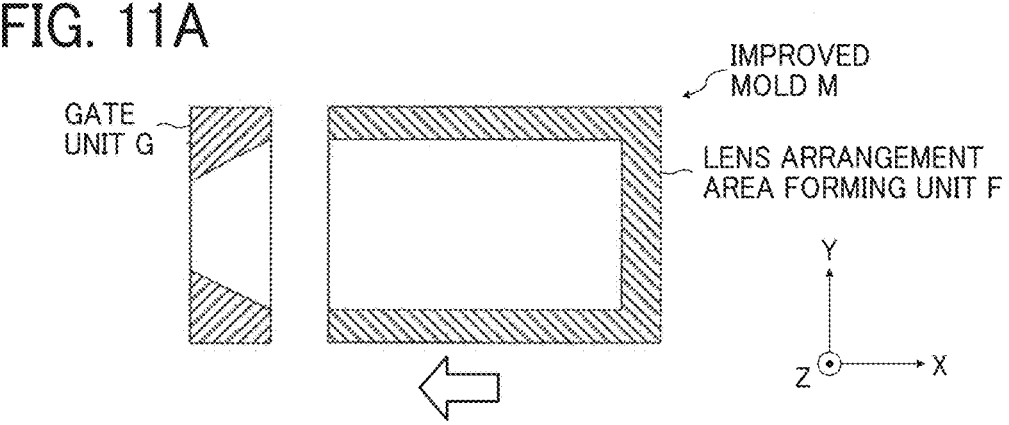
FIGS. 11A through 11D are illustrations of a procedure for producing a microlens array element according to an embodiment of the present disclosure by injection molding.
Figure 11B:
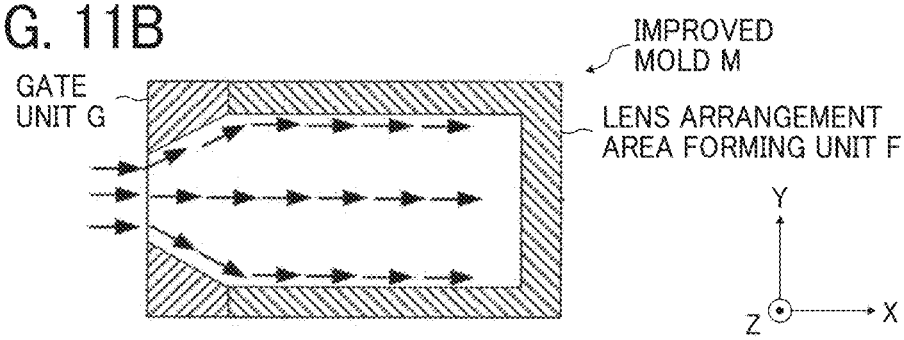
Figure 11C:
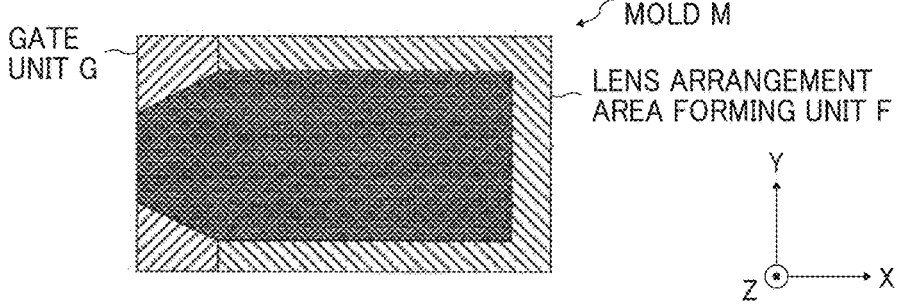
Figure 11D:
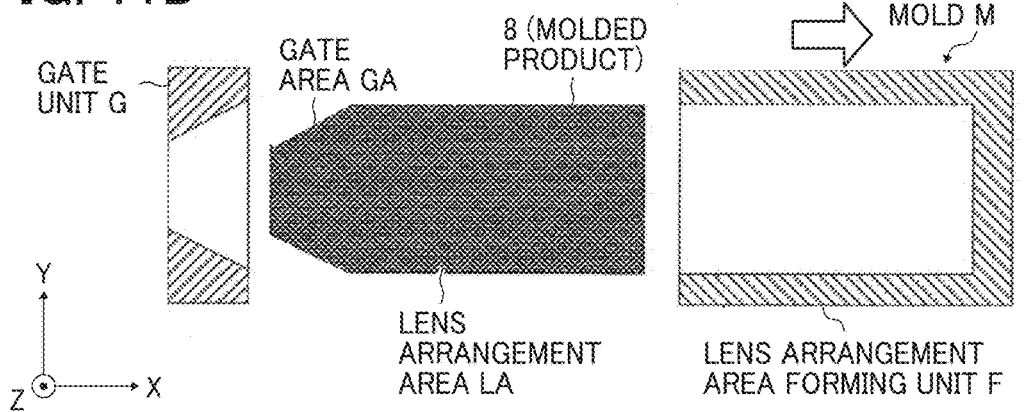

In the injection process (see FIG. 11B), resin regularly (uniformly) flows within the improved mold M (see arrows in FIG. 11B). As a result, no deformation occurs in a molded product according to the present embodiment (see FIG. 11C and FIG. 11D) unlike the molded product according to the comparative example. The molded product according to the present embodiment includes a lens arrangement area LA having a rectangular shape in the planar view and a gate area GA having an isosceles trapezoid shape in the planar view. The gate area GA is formed in the gate unit G, having a shape (the isosceles trapezoid shape in the planar view) that corresponds to the shape of the inner wall surface of the gate unit G.

Figure 12A:
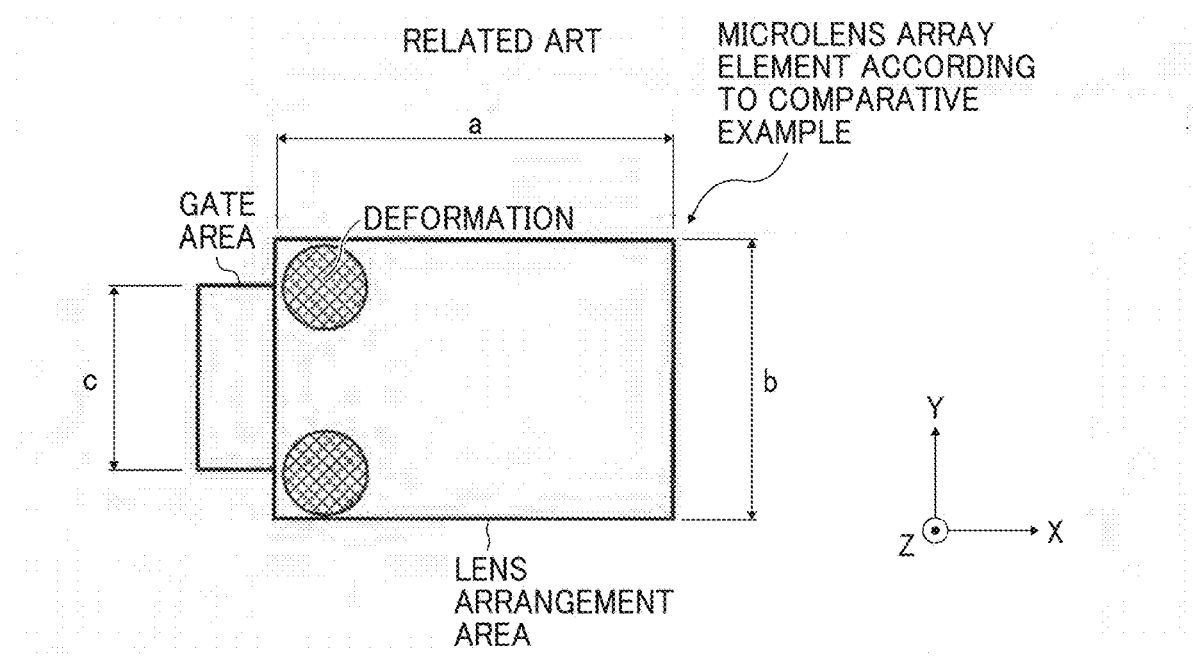
FIGS. 12A and 12B are plan views of the microlens array element according to the comparative example and the microlens array element according to the embodiment of the present disclosure, respectively.
Figure 12B:
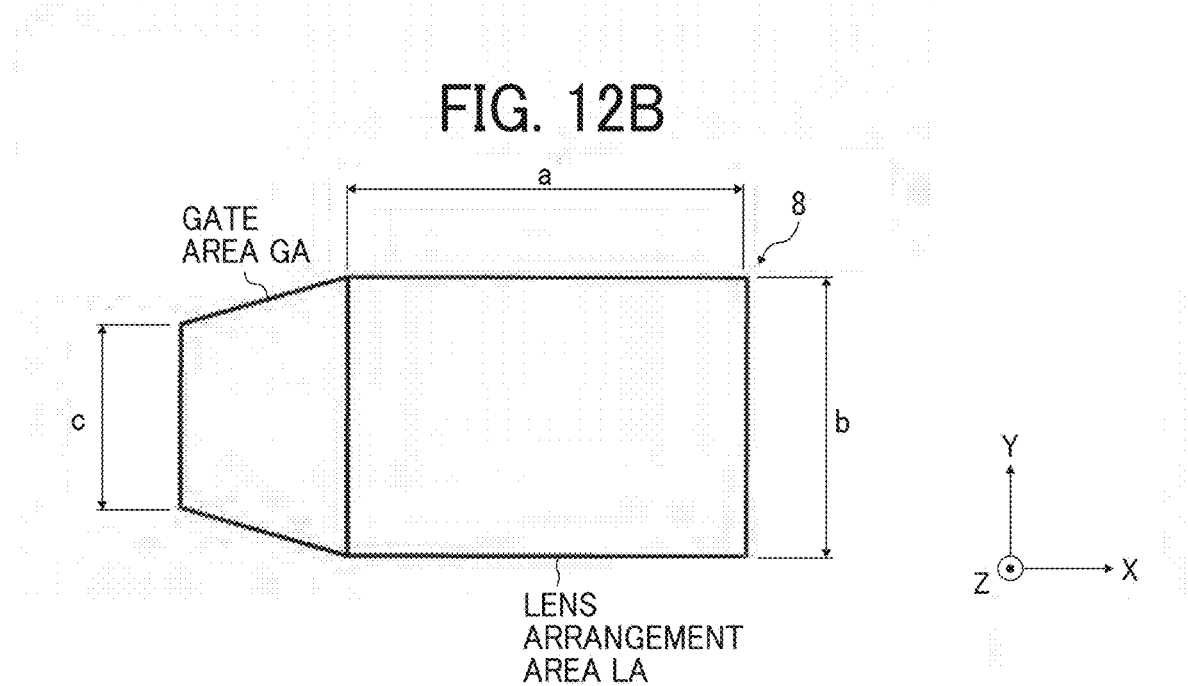

FIG. 12A and FIG. 12B are illustrations of the microlens array element according to the comparative example and the microlens array element 8 according to the present embodiment, respectively. As illustrated in FIG. 12A and FIG. 12B, each microlens array element includes a lens arrangement area and a gate area, which are adjacent to each other. In FIG. 12A, the shaded circles represent areas in which deformation occurs in the lens arrangement area according to the comparative example.

More specifically, each of the lens arrangement area according to the comparative example and the lens arrangement area LA according to the present embodiment has a rectangular area having a first side with a length a that is parallel to the X axis and a second side with a length b that is parallel to the Y axis in the planar view (when viewed from the Z-axis direction). The length a is longer than the length b.

In the comparative example, the gate area is an area having a rectangular shape in the planar view. The gate area is disposed on the −X side of the lens arrangement area, and the +X-side edge of the gate area is attached to the center part (an area other than ends) of the −X side of the second side of the lens arrangement area. That is, the length c in the Y-axis direction of the gate area according to the comparative example is constant. Further, the length c is shorter than the length b.

In the present embodiment, the gate area GA is disposed on the −X side of the lens arrangement area LA, and the +X-side edge of the gate area GA is attached to the −X-side second side of the lens arrangement area LA. The gate area GA according to the present embodiment gradually increases in Y-axis-directional width in a direction that approaches the lens arrangement area LA. That is, the gate area GA according to the present embodiment has a tapered shape.

More specifically, the gate area GA according to the present embodiment has an isosceles trapezoid shape in the planar view. The lower base of the isosceles trapezoid shape (the gate area GA) coincides with the second side of the lens arrangement area LA. That is, the lower base of the gate area GA according to the present embodiment has the length b. The upper base of the gate area GA according to the present embodiment has the length c. The Y-axis-directional width at the −X-side edge of the gate area GA is common between the comparative example and the present embodiment, and the Y-axis-directional width at the +X-side edge of the gate area GA differs between the comparative example and the present embodiment. The gate area GA according to the comparative example has the Y-axis-directional width that is constant from the −X-side edge to the +X-side edge of the gate area. In contrast, the gate area GA according to the present embodiment has the Y-axis-directional width that monotonically increases in a direction from the −X-side edge to the +X-side edge of the gate area GA.

Figure 13A:
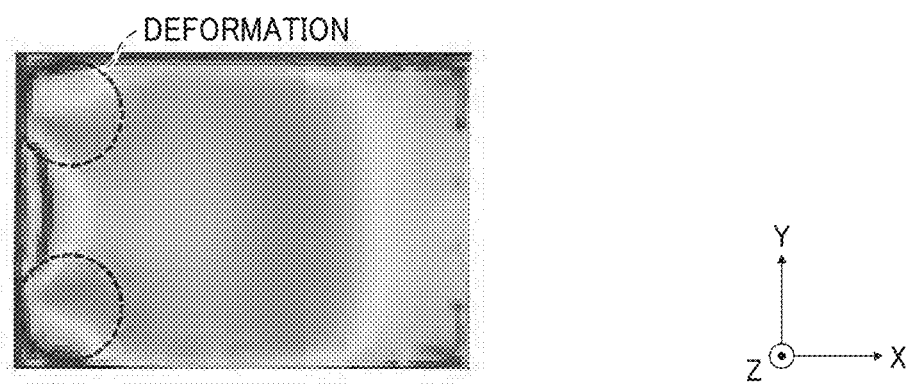
FIGS. 13A and 13B are illustrations of the presence and absence of deformation in lens arrangement areas of the microlens array element according to the comparative example and the microlens array element according to the embodiments of the present disclosure, respectively.

FIG. 13A illustrates an analysis result of the presence or absence of deformation in the lens arrangement area of the microlens array element (molded product) according to the comparative example. In the comparative example, a very large degree of deformation is confirmed in areas enclosed by dashed circles in FIG. 13A.

Such a deformation causes an increase in shift of the orientation of the optic axis in double refraction to be described later. When a microlens array element with such a shift in the orientation of the optic axis in double refraction is used in the image display apparatus 1000 in FIG. 1 to generate a virtual image based on image data of the white color, it is recognized that the generated virtual image represents light pink color in areas corresponding to the areas of deformation in the microlens array element.

Figure 13B:
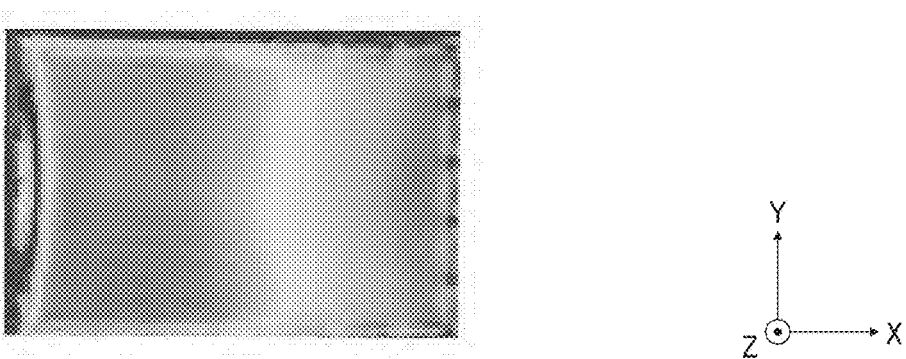

FIG. 13B illustrates an analysis result of the presence or absence of deformation in the lens arrangement area LA of the microlens array element 8 (molded product) according to the present embodiment. In the present embodiment, any remarkable deformation is not confirmed over the whole lens arrangement area LA.

That is, using the improved mold M to produce the microlens array element 8 according to the present embodiment allows resin to regularly (uniformly) flow within the improved mold M, resulting in an effective reduction in occurrence of deformation of a molded product.

When the microlens array element 8 thus obtained by using such an improved mold M is used in the image display apparatus 1000 in FIG. 1 to generate a virtual image based on image data of the white color, it is recognized that a desired white color is achieved over the generated virtual image as a whole.

Note that the gate area GA is secondarily formed with the formation of the lens arrangement area LA in the molded product. Accordingly, the gate area GA, which does not contribute to the function of the microlens array element 8, may be removed by cutting or sanding to downsize the microlens array element 8.

Figure 14:
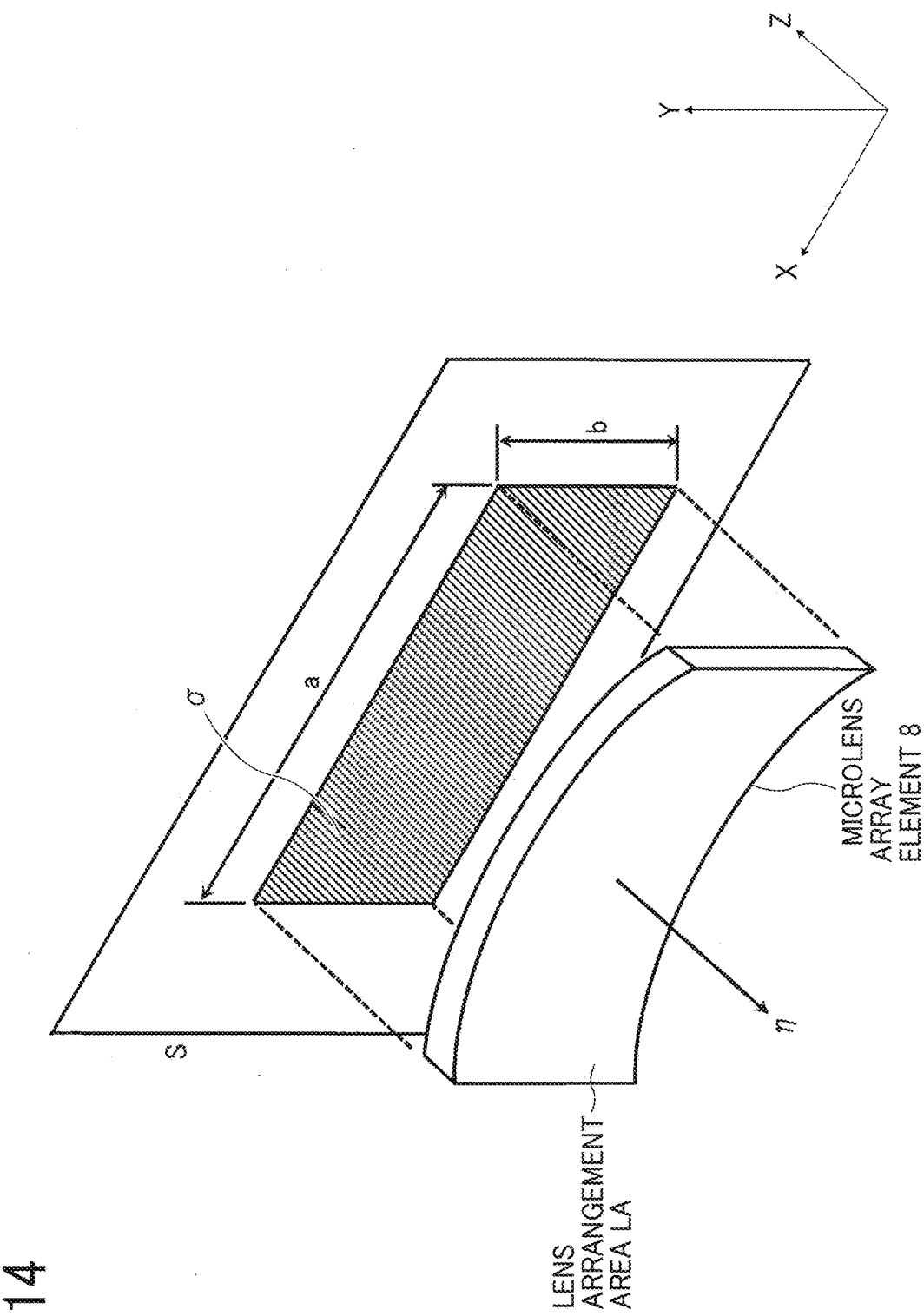
FIG. 14 is an illustration of a microlens array element having a curved lens arrangement area that is treated same as a microlens array element having a flat lens arrangement area.

In the above description, the cases where the microlens array element 8 with the lens arrangement area LA having a substantially flat-plate shape is produced by injection molding, using the improved mold M are described. However, no limitation is intended herein. In some embodiments, the lens arrangement area LA may be curved along the X-axis direction in the microlens array element 8 produced using the improved mold M as illustrated in FIG. 14. Such a microlens array element 8 curved along the X-axis direction has an advantageous effect that reduces the difference in optical-path length from the two-dimensional deflector 6 to a microlens between the microlenses when light deflected by the two-dimensional deflector 6 directly enters the microlens array element 8 without hitting the concave-surface mirror 7. In some other embodiments, the microlens array element 8 produced by using the improved mold M may be curved along, for example, the Y-axis direction in addition to or in place of the X-axis direction.

In such a case, the microlens array element 8 is projected onto a virtual plane S perpendicular to the normal line η of the center of the lens arrangement area LA of the microlens array element 8, and a projection image a (for example, a rectangular shape) thus obtained is assumed as the above-described substantially flat-plate shaped microlens array element 8. Note that the inner wall surface of the lens arrangement area forming unit F of the mold M is preferably curved to produce the curved microlens array element 8.

As described above, the present inventors have found that the microlens array element 8 produced by using the improved mold M according to the present embodiment has an advantageous effect that reduces or prevents a shift in orientation of the optic axis in double refraction, thus increasing the optical properties. The "optic axis" is referred to also as a main axis (a fast axis or a slow axis) of the double refraction. The "shift in orientation of the optic axis" is referred to also as a variation in orientation of the optic axis.

Figure 21:
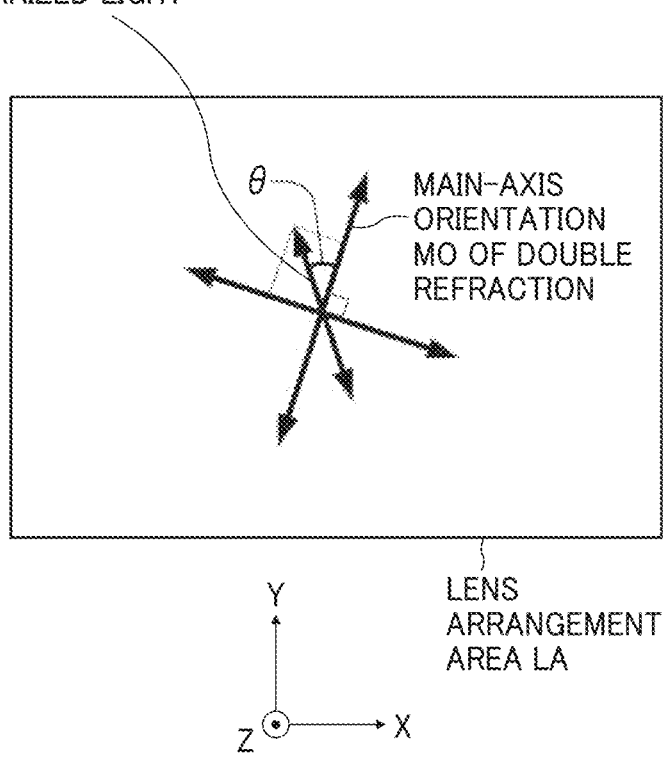
FIG. 21 is an illustration of a shift in orientation of the optic axis.

The "shift in orientation of the optic axis" is defined as an angle θ formed by the orientation of the optic axis and the polarization direction (hereinafter, referred to also as a "reference orientation RO") of linearly polarized light (a laser light that has hit the concave-surface mirror 7) that enters the lens arrangement area LA of the microlens array element 8 (see FIG. 21). As a device for measuring double refraction, the birefringence measurement system produced by HINDS Instruments is used, for example, as cited on the website of http://www.hindsinstruments.com/products/birefringence-measurement-systems/. For example, two polarization elements are disposed at the entrance side and the exit side of the microlens array, respectively, and these polarization elements are rotated in synchronization by, e.g., a motor, with a fixed ratio in rotational angle between these polarization elements, thereby obtaining a signal in which multiple periods are mixed. This obtained signal is analyzed to thus measure the double refraction (birefringence). The "polarization direction" refers to a vibration direction of the electric field of the linearly polarized light. The orientation of the optic axis is defined for each microlens of the microlens array element 8. The polarization direction of the linearly polarized light that enters the microlens array element 8 is also defined for each microlens of the microlens array element 8.

For example, the polarization direction of light (linearly polarized light) emitted from the light-source unit 100 is originally set to the Y-axis direction. The polarization direction of some rays of the linearly polarized light other than rays that enter the microlens array element 8 rotates within an XY plane, thereby to shift from the Y-axis direction as the linearly polarized light is deflected by the two-dimensional deflector 6.

In general, the double refraction is described in terms of the retardation (phase difference) and the optic axis (the fast axis or the slow axis). Whether the main-axis orientation MO of the double refraction is the fast-axis orientation or the slow-axis orientation depends on the property of resin material for the microlens array element. Double refraction is, as known in the field of optics, the separation of a ray of light into two unequally refracted, plane-polarized rays of orthogonal polarizations, occurring in crystals in which the velocity of light rays is not the same in all directions.

In this case, the retardation (phase difference) is described in terms of two linearly polarized light beams having polarization directions perpendicular to each other, of the linearly polarized light that has passed through the lens arrangement area LA of the microlens array element 8.

More specifically, the slow-axis orientation is the polarization direction of one of the two linearly polarized light beams that slowly travels and is delayed in phase with reference to the linearly polarized light that has entered the lens arrangement area LA. The fast-axis orientation is the polarization direction of the other beam of the two linearly polarized light beams that travels fast and accelerates the phase with reference to the linearly polarized light that has entered the lens arrangement area LA. The retardation satisfies the following conditional expressions where Na denotes a refractive index of the slow axis of the microlens array element 8 with respect to the reference orientation RO (the polarization direction of the linearly polarized light that enters the lens arrangement area LA of the microlens array element 8, Nb denotes a refractive index of the fast axis with respect to the reference orientation RO (Na is larger than Nb), d denotes a thickness of the microlens array element 8, R denote retardation, and ΔN denotes double refraction: R=ΔN·d (nm)=ΔN·d·360/λ (deg), and ΔN=Na−Nb.

Figure 15A:
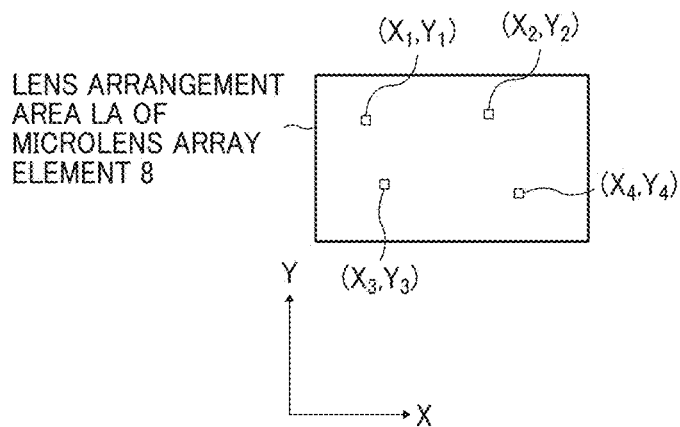
FIGS. 15A through 15C are illustrations for describing how to determine whether the white color is achieved at a plurality of points in the lens arrangement area of the microlens array element when a virtual image is formed based on image data of the white color.
Figure 15B:
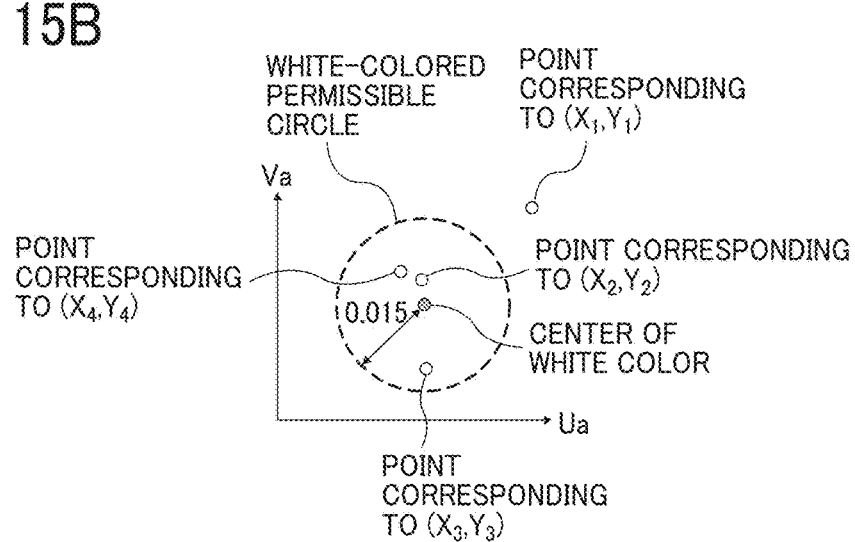
Figure 15C:
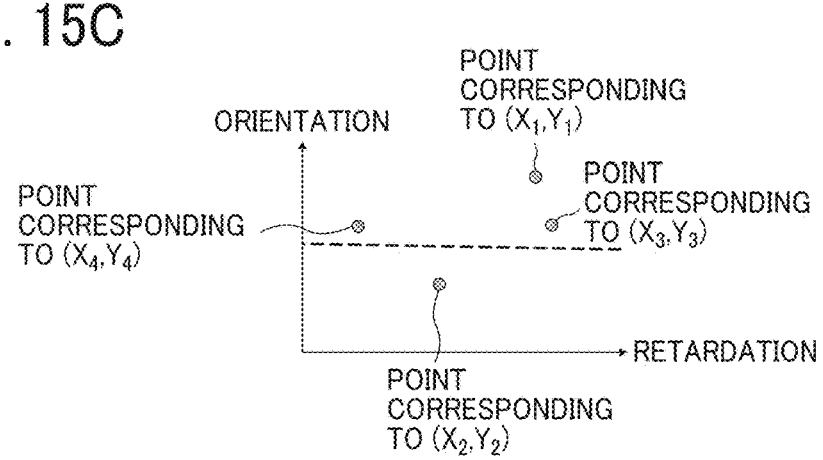

Here, some microlens array elements 8 were prepared under various molding conditions, such as the pressure applied to the mold M and the temperature of the mold M, and the speed of injecting resin. The prepared microlens array elements 8 were mounted on the image display apparatus 1000 in FIG. 1, and virtual images were formed based on image data of the white color. Such a virtual image was analyzed to determine which area achieves the white color and which area fails to achieve the white color in the lens arrangement area LA using the processes in FIG. 15A through 15C. In FIG. 15A through 15C, the x-y coordinates of a plurality of points are (x1, y1), (x2, y2), (x3, y3), and (x4, y4) in the lens arrangement area LA of the microlens array element 8. In this case, although only the above-described four points are represented in FIG. 15A through 15C, the microlens array element 8 is actually divided into approximately 15000 sections for analysis.

In the present disclosure, the expression "achieves the white color" is defined to mean that a measured chromaticity coordinate falls within a circle having a radius of 0.015, of which the center is the center of the white color, in the Ua-Va chromaticity coordinate system in FIG. 15B. Hereinafter, the above-described circle having the radius of 0.015 is referred to also as a "white-colored permissible circle". As can be seen from FIG. 15B, the coordinates (x2, y2), (x3, y3), and (x4, y4) are within the white-colored permissible circle, and the coordinate (x1, y1) is outside the white-colored permissible circle.

Note that the "center of the white color" may be (⅓, ⅓) in the x-y chromaticity coordinate system. Alternatively, the coordinate of the "center of the white color" may be determined by sensory assessment. As the coordinate of the center of the white color in the x-y chromaticity coordinate system to recognize the white color differs by a human race, the coordinate may be determined as appropriate.

Figure 16:
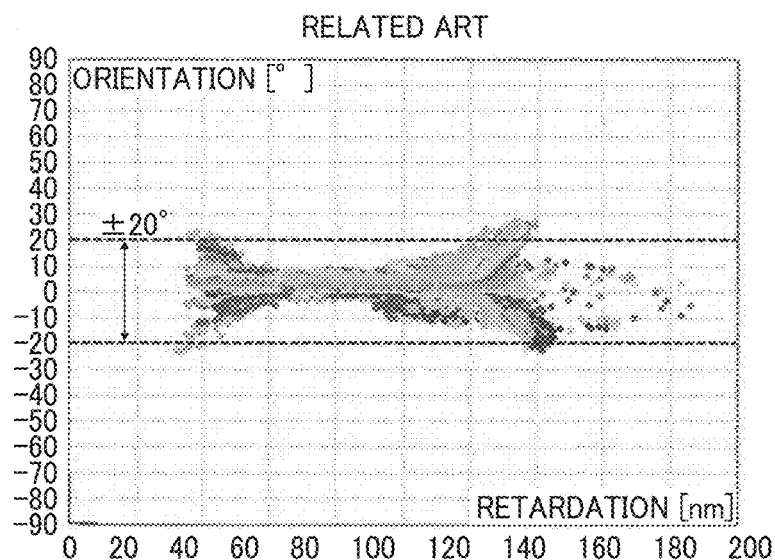
FIG. 16 is a graph for describing a relation between retardation and the orientation of the optic axis when a virtual image is formed based on image data of the white color by using the microlens array element according to the comparative example.
Figure 17:
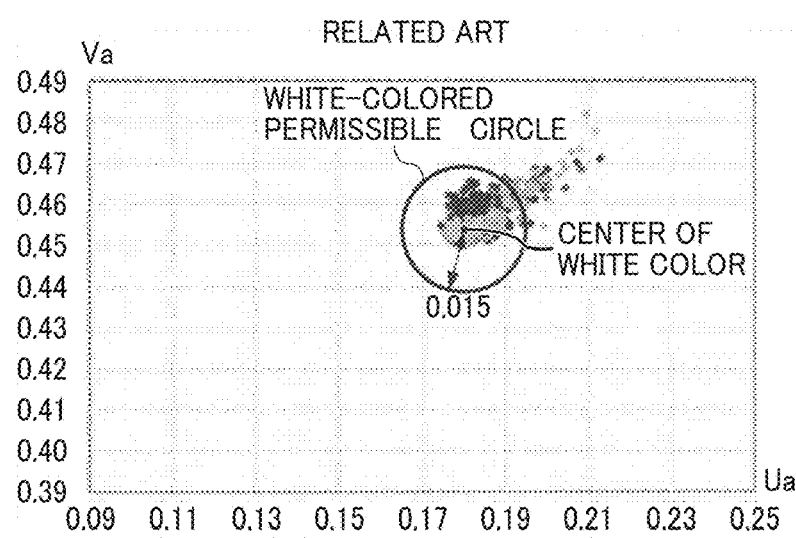
FIG. 17 is an illustration of a chromaticity map of Ua-Va chromaticity coordinates measured in a virtual image formed based on the image data of the white color using the microlens array element according to the comparative example.

FIG. 16 is a graph of a relation between the retardation and the shift in orientation of the optic axis in the microlens array element according to the comparative example. In FIG. 16, the reference orientation RO (the polarization direction of the linearly polarized light) is designated as 0°. FIG. 17 is an illustration of a chromaticity map of the Ua-Va chromaticity coordinates measured from the virtual image generated based on the image data of the white color using the microlens array element according to the comparative example. It has been found by the present inventors that, the range that achieves the white color in the virtual image (the range of the Ua-Va chromaticity coordinates that fall within the white-colored permissible circle in FIG. 17) refers to the range represented by two dark-colored dashed lines in FIG. 16, i.e., the zone in which the shift (θ) in orientation of the optic axis falls within the range of ±20° (ranges from −20° to +20°). More specifically, the range that achieves the white color in the virtual image is, for example, the zone in which the shift (θ) in the slow-axis orientation falls within the range of ±20° when the main-axis orientation MO of the double refraction is the slow-axis. In contrast, it has been found by the present inventors that the range that fails to achieve the white color in the virtual image (the range of the Ua-Va chromaticity coordinates that fall outside the white-colored permissible circle in FIG. 17) is another zone in which the shift (θ) in orientation of the optic axis falls outside the range of ±20°. The same applies to the case where the main-axis orientation of the double refraction is, for example, the fast-axis orientation.

As described above, the microlens array element 8 according to the present embodiment produced by using the improved mold M reduces the occurrence of deformation, thereby increasing the optical properties of the microlens array element 8. Accordingly, the position and posture of the microlens array element 8 are adjusted with reference to the reference orientation RO (the polarization direction of the linearly polarized light that enters the lens arrangement area LA of the microlens array element 8), thereby to allow the shift (θ) in orientation of the optic axis to fall within the range of ±20° over the whole lens arrangement area LA (all of the microlenses). In other words, it has been found by the present inventors that there is the reference orientation RO (the polarization direction of the linearly polarized light that enters the microlens array element 8) that allows the shift (θ) in orientation of the optic axis to fall within the range of ±20° over the whole lens arrangement area LA (all of the microlenses). It has been confirmed that the white color was achieved over the whole area of a virtual image generated by the image display apparatus 1000 equipped with the microlens array element 8 according to the present embodiment (see FIG. 18 and FIG. 19), compared to the comparative example of FIG. 16 and FIG. 17.

Note that the white color has a very small range in which human eye identifies a color as compared to other colors, such as the red color, the green color, and the blue color. That is, the white-colored permissible circle has a much smaller radius than those of the red-colored permissible circle, the green-colored permissible circle, and the blue-colored permissible circle. In short, achieving the white color over the whole area in the virtual image means achieving any desired color other than the white color over the whole area of the virtual image.

Figure 18:
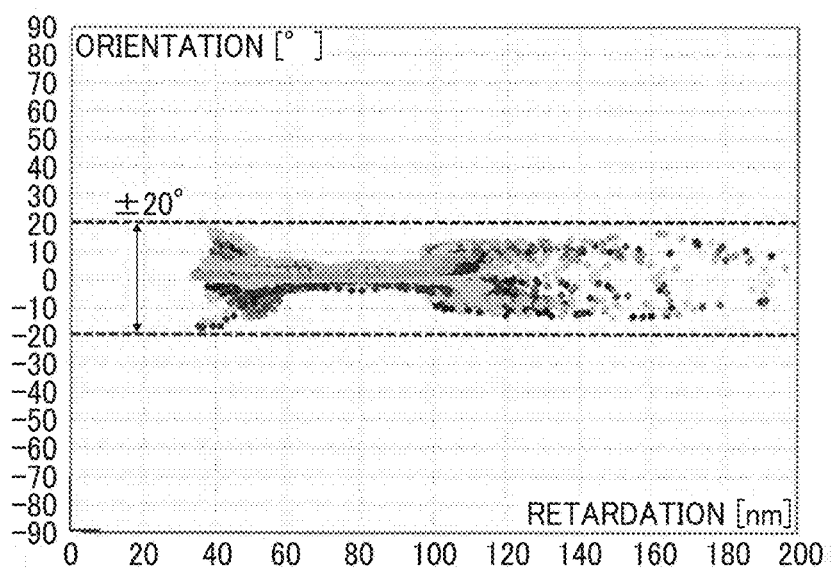
FIG. 18 is a graph for describing a relation between retardation and the orientation of the optic axis when a virtual image is formed based on image data of the white color by using the microlens array element according to the embodiments of the present disclosure.
Figure 19:
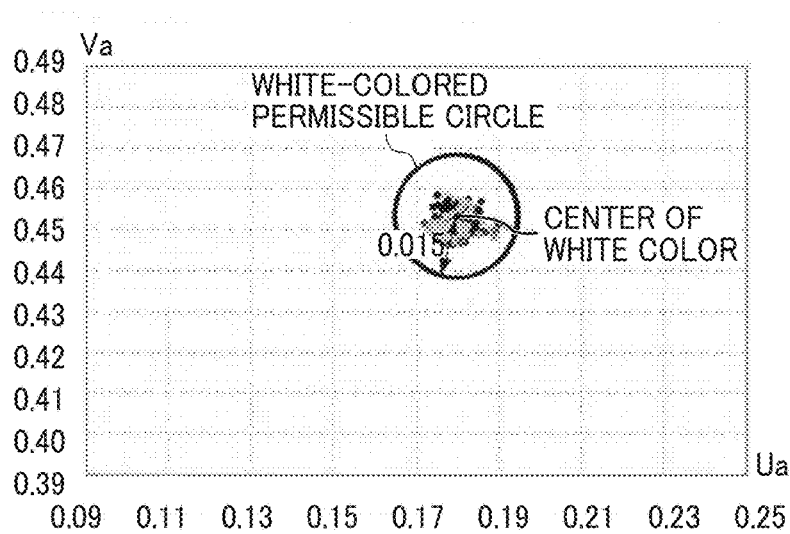
FIG. 19 is an illustration of a chromaticity map of Ua-Va chromaticity coordinates measured in a virtual image formed based on the image data of the white color using the microlens array element according to the embodiment of the present disclosure.

As can be seen from FIG. 16 and FIG. 18, the retardation values widely ranges, which is difficult to control with the molding conditions (for example, pressure applied to and the temperature of the mold M and the injection speed of resin) or the shape (for example, a tapered shape) of the gate unit G of the mold M.

In short, controlling the orientation of the optic axis can effectively increase the optical properties of the lens arrangement area LA of the microlens array element 8, irrespective of resin material.

Note that the shapes of the inner wall of the gate unit G and the gate area GA of the microlens array element 8 are not limited to the isosceles trapezoid shape in the planar view, and each may be a shape that gradually or in a stepwise manner increases in Y-axis-directional width in a direction that approaches the lens arrangement area forming unit F and the lens arrangement area LA in the planar view.

Figure 20A:
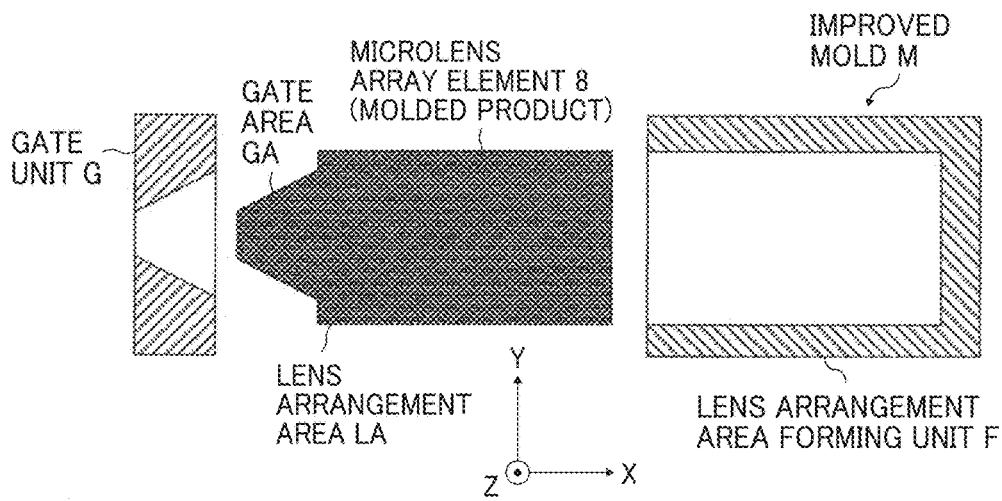
FIGS. 20A through 20C are illustrations of microlens array elements produced using improved molds according to variations.

As illustrated in FIG. 20A for example, the +X-side edge (the exit of the gate unit G) of the inner wall of the gate unit G may have the Y-axis-directional width that is smaller than the Y-axis-directional width of the inner wall of the lens arrangement area forming unit F. In other words, the Y-axis-directional width (maximum width as the Y-axis-directional width of the gate area GA) of +X-side edge of the gate area GA may be smaller than the Y-axis-directional width of the lens arrangement area LA.

Figure 20B:
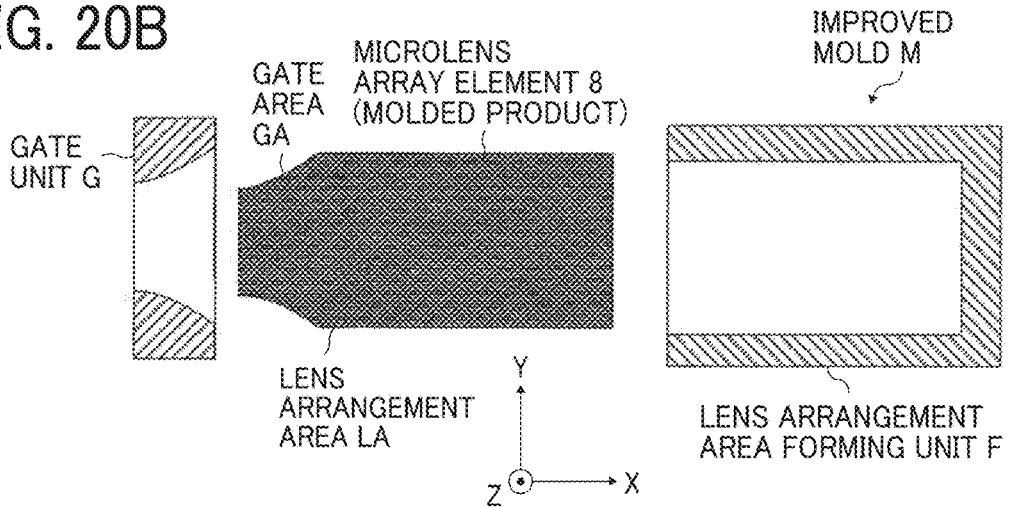

As illustrated in FIG. 20B for another example, the +Y-side and −Y-side inner walls of the gate unit G and the +Y-side and −Y-side side surfaces of the gate area GA may be curbed.

Figure 20C:
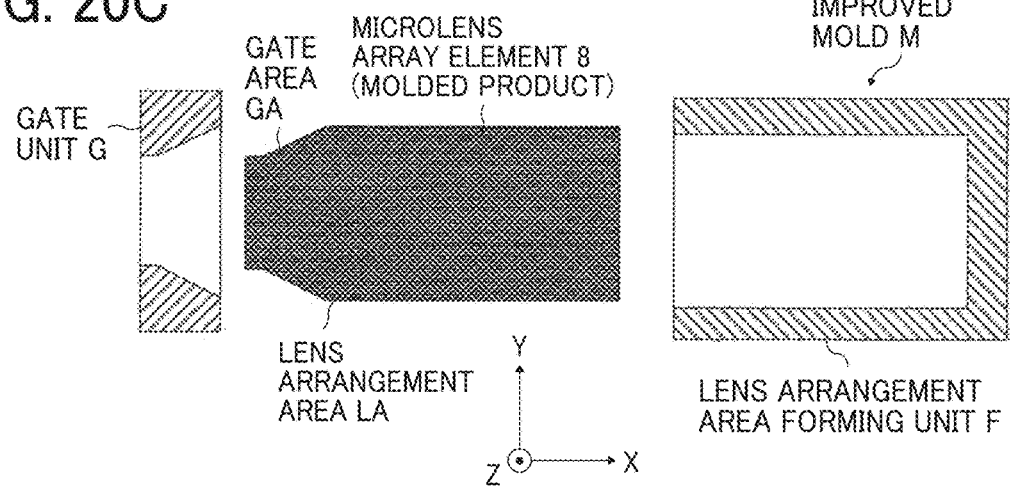

As illustrated in FIG. 20C for still another example, the +Y-side and −Y-side inner walls of the gate unit G and the +Y-side and −Y-side side surfaces of the gate area GA may be partially parallel to the XZ plane.

As described above, each microlens of the microlens array element 8 according to the present embodiment, which is made of resin, satisfies conditional expression below where θ denotes an angle formed by the orientation of the optic axis (the main-axis orientation MO of double refraction) and the reference orientation RO (the polarization direction of the linearly polarized light that enters the microlens array element 8) in the lens arrangement area LA of the microlens array element 8:

$$-20° \leq \theta \leq 20°.$$

Preferably, the above-described conditional expression is satisfied over the whole area of the lens arrangement area LA.

The microlens array element 8 according to the present embodiment, which is made of resin, includes the lens arrangement area LA and the gate area GA, which are adjacent to each other. In this case, the gate area GA has the Y-axis-directional width (see FIG. 11A through FIG. 11D) that gradually increases in a direction that approaches the lens arrangement area LA in the planar view. In other words, the microlens array element 8 is produced by injection molded using the improved mold according to the present embodiment.

The microlens array element 8 according to the present embodiment can increase the optical properties.

In some embodiments, the gate area GA may have a Y-axis-directional width that increases in a stepwise manner in the direction that approaches the lens arrangement area LA in the planar view. In some embodiments, the gate area GA may have a +Y-side surface and a −Y-side surface that are tilted (tilted surfaces) or curved (curved surfaces). The width between the +Y-side surface and the −Y-side surface increases in the direction that approaches the lens arrangement area LA in the planar view. In this configuration, the tilt angle of each tilted surface and the radius of curvature of each curved surface each is determined by the shape of the inner wall of the gate unit G of the improved mold M.

Preferably, the gate area GA has a maximum width (in the Y-axis direction) that is smaller than or equal to the length of the edge (the −X-side edge of the lens arrangement area LA) on the side of the gate area GA of the lens arrangement area LA in the planar view. More preferably, the maximum width of the gate area GA is equal to the width of the edge on the side of the gate area GA of the lens arrangement area LA.

In some other embodiments, the lens arrangement area LA may be curved along at least one direction (for example, the X-axis direction or the Y-axis direction).

Preferably, the lens arrangement area LA has a rectangular shape having, on the side of the gate area GA (on the −X side of the lens arrangement area LA), an edge shorter than another edge in the planar view. This configuration can downsize the gate area GA. In some embodiments, the lens arrangement area LA may have any shape other than the rectangular shape in the planar view.

In the present embodiment, the lens arrangement area LA is an area in which a plurality of microlenses is arranged in array.

The image display apparatus 1000 includes the light-source unit 100 including a semiconductor laser (a light source to emit linearly polarized light), the two-dimensional deflector 6 (an image forming element), and the microlens array element 8 (a microlens array) including a lens arrangement area LA. The light for forming an image enters the lens arrangement area LA. This configuration can display an image of desired color. The reference orientation RO coincides with the polarization direction of the light (the linearly polarized light) for forming an image.

The image display apparatus 1000 includes a plurality of semiconductor lasers. The light-source unit 100 further includes a beam combining prism 101 (a combiner) to combine light beams emitted from the plurality of semiconductor lasers. The chromaticity coordinates over the whole area of an image fall within a circle (the white-colored permissible circle) having a radius of 0.015, of which the center is the center of the white color, in the chromaticity coordinate system. The image is formed by driving the plurality of semiconductor lasers based on the image data of the white color.

The image display apparatus 1000 further includes a concave mirror 9 (a light emitter) to cause light having passed through the microlens array element 8 to travel to the transmission and reflection member 10. This configuration can display a virtual image of desired color.

An object apparatus O including the image display apparatus 1000 and a mobile object equipped with the image display apparatus 1000 can provide information of a virtual image with a good reproducibility to a passenger in the mobile object.

An improved mold M according to the present embodiment is a mold to produce a microlens array element 8 by injection molding. The improved mold M includes a lens arrangement forming unit F (a forming unit) to form a lens arrangement area LA of the microlens array element 8 and a gate unit G to let resin into the lens arrangement area forming unit F. The gate unit G has an inner wall that gradually increases in width in a direction that approaches the lens arrangement area forming unit F in the planar view.

This configuration can prevent or reduce the occurrence of deformation in the lens arrangement area LA of the microlen array element 8 produced.

In some embodiments, the gate area GA may have a Y-axis-directional width that increases in a stepwise manner in the direction that approaches the lens arrangement area LA in the planar view. In some embodiments, the gate unit G may have a +Y-side inner-wall surface and a −Y-side inner-wall surface that are tilted (tilted surfaces) or curved (curved surfaces). The width between the +Y-side inner-wall surface and the −Y-side inner-wall surface increases in the direction that approaches the lens arrangement area LA in the planar view. In this configuration, the tilt angle of each tilted surface and the radius of curvature of each curved surface may be changed as appropriate according to the molding conditions, such as the pressure applied to the mold M and the temperature of the mold M, the injection speed of the resin, and so on).

Preferably, the inner wall of the gate unit G has a maximum width (the Y-axis-directional width) that is less than or equal to the width of the edge on the side of the gate unit G (on the −X side) of the lens arrangement forming unit F. More preferably, the inner wall of the gate unit G is equal to the width of the edge of the gate unit G of the lens arrangement forming unit G.

In some embodiments, the lens arrangement area forming unit F may be curved along at least one direction (for example, the X-axis direction or the Y-axis direction).

Preferably, the inner wall of the lens arrangement area forming unit F may have a rectangular shape having, on the side of the gate unit G (the −X side) of the lens arrangement area forming unit F, an edge shorter than another edge in the planar view. This configuration can downsize the gate unit G. In some embodiments, the lens arrangement area forming unit F may have any shape other than the rectangular shape in the planar view, according to the lens arrangement area LA to be formed.

The microlens array element 8 produced using the improved mold M according to the present embodiment can increase the optical properties.

In the present embodiment, the two-dimensional deflector 6 as an image forming element to form an image on the microlens array element 8 is constituted by the MEMS mirrors. However, no limitation is intended herein. Alternatively, in some embodiments, the two-dimensional deflector 6 may be constituted by any other type of mirror such as a galvano mirror.

In the present embodiment, a semiconductor laser is used as a light source. However, no limitation is intended herein. Any light source that emits linearly polarized light is available.

In the example embodiment described above, a color image is generated. However, no limitation is indicated therein, and a monochrome image may be generated instead of the color image.

The transmission and reflection member may be made of a material other than that of the front windshield of a mobile object, and may be arranged between the front windshield and an observer, for example, like a combiner.

The image display apparatus according to the present disclosure may adopt a panel system as the HUD projection method, instead of the above-described laser scanning system. In the panel system, an image forming element, such as a liquid crystal display (LCD), a digital micro-mirror device (DMD) panel (digital mirror device panel), or a vacuum fluorescent display (VFD), is used to form an intermediate image. Note that, unlike the panel type where the image is formed by partially light blocking over the entire screen emission, since emitting or non-emitting can be assigned to each pixel, a high-contrast image can be formed in general.

The image display apparatus according to the present disclosure is applicable not only to a HUD, which is mounted on a mobile object, but also to, for example, a head-mounted display that is mounted on the head of an observer, a prompter, and a projector.

Thus, the embodiments of the present disclosure may be applied to an image display apparatus including a microlens array element made of resin.

Further, the embodiments of the present disclosure are effective particularly in a microlens array element that is less likely to cause the occurrence of speckle noise. However, no limitation is intended herein. The present disclosure is also applicable in a screen member such as a diffuser panel.

In the above-described embodiment, cases in which the image display apparatus is provided for a mobile object such as a vehicle, an aircraft, a ship, and a mobile object, such as a robot, were described. However, no limitation is indicated thereby, and modification may be made as long as the image display apparatus is provided for an object. The term "object" includes not only a mobile object but also an object that is located on a permanent basis or an object that is transportable.

Hereinafter, a description is provided of process of thinking, in which the inventor has conceived of the above-described embodiments.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An apparatus comprising:
a light source to emit the light;
an image forming element to form an image with the light emitted from the light source; and
a microlens array comprising:
N lenses ranging from a $1^{st}$ lens to an $N^{th}$ lens, N being a positive integer; and
a lens arrangement area having the N lenses arranged in array, the lens arrangement area to receive light emitted from a light source,
at least one of the N lenses satisfying a conditional expression below:

$-20° \leq \theta \leq 20°$ where
θ denotes an angle formed by a main-axis orientation of double refraction and a reference orientation,
wherein at least a part of the lens arrangement area is irradiated with the light for forming the image.

2. The apparatus according to claim 1,
wherein the light-source unit includes a light source to emit the light that is linearly polarized, and
wherein the reference orientation is a polarization direction of the light for forming the image.

3. The apparatus according to claim 1,
wherein the light-source unit includes a plurality of light sources constituted by the light source and at least another light source,
wherein the light-source unit further includes a combiner to combine light beams emitted from the plurality of light sources into one light beam, and
wherein chromaticity coordinates over a whole area of an image, which are formed with light beams emitted from the plurality of light sources based on image data of a white color, fall within a circle having a radius of 0.015 and having a center at a center of the white color in a chromaticity coordinate system.

4. The apparatus according to claim 1, further comprising:
a light emitter to project the light having passed through the microlens array; and
a transmission and reflection member to make the light projected from the light emitter viewable.

5. An object apparatus comprising:
the apparatus according to claim 4; and
an object equipped with the apparatus.

6. The object apparatus according to claim 5,
wherein the object is a mobile object, and
wherein the transmission and reflection member is a windshield mounted on the mobile object.

7. An apparatus comprising:
a light source to emit light, the light being polarized;
an image forming element to form an image with the light emitted from the light source; and
a screen having N lenses arranged in array, N being a positive integer, the screen having an optically effective area through which the light for forming the image passes, the N lenses ranging from a $1^{st}$ lens to an $N^{th}$ lens,
at least one of the N lenses of the screen satisfying a conditional expression below:

$-20° \leq \theta \leq 20°$ where
θ denotes an angle formed by a main-axis orientation of double refraction and a polarization direction of the light beam.

8. The apparatus according to claim 7,
wherein the screen includes a microlens array having a lens arrangement area including the N lenses, and
wherein the optically-effective area is at least a part of the lens arrangement area.

9. The apparatus according to claim 7,
wherein the light source includes a plurality of light sources,
wherein the light source further includes a combiner to combine light beams emitted from the plurality of light sources into one light beam, and
wherein chromaticity coordinates over a whole area of an image, which are formed with light beams emitted from the plurality of light sources based on image data of a white color, fall within a circle having a radius of 0.015 and having a center at a center of the white color in a chromaticity coordinate system.

10. The apparatus according to claim 7, further comprising:
a light emitter to project the light having passed through the screen; and
a transmission and reflection member to make the light projected from the light emitter viewable.

11. A mold for producing a microlens array by injection molding comprising:
a lens section to form a lens arrangement area, in which a plurality of lenses are to be formed, of a microlens array; and
a gate section to let resin in the lens section,
the gate section having an inner wall that increases in width in a direction that approaches the lens section in a planar view.

12. The mold according to claim 11,
wherein the inner wall of the gate section has a maximum width that is less than or equal to a width of an edge on a side of the lens section which is adjacent to the gate section.

13. The mold according to claim 11,
wherein an inner wall of the lens section has a rectangular shape having, on a side of the gate section, an edge shorter than another edge in the planar view.

14. A microlens array molded using the mold according to claim 11.

15. A method of displaying an image, comprising:
generating polarized light;
irradiating the polarized light through a screen including a plurality of lenses in an array;
displaying an image using the polarized light which has passed through the screen,
wherein each of the plurality of lenses satisfies:

$-20° \leq \theta \leq 20°$ where θ denotes an angle formed by a main-axis orientation of double refraction and a polarization direction of the polarized light.

* * * * *